(12) United States Patent
Sugita

(10) Patent No.: US 10,627,610 B2
(45) Date of Patent: Apr. 21, 2020

(54) ZOOM LENS AND IMAGE PICKUP APPARATUS

(71) Applicant: CANON KABUSHIKI KAISHA, Tokyo (JP)

(72) Inventor: Shigenobu Sugita, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 168 days.

(21) Appl. No.: 16/009,607

(22) Filed: Jun. 15, 2018

(65) Prior Publication Data
US 2019/0004296 A1    Jan. 3, 2019

(30) Foreign Application Priority Data
Jun. 28, 2017    (JP) .................. 2017-126010

(51) Int. Cl.
| | | |
|---|---|---|
| G02B 15/14 | (2006.01) | |
| G02B 15/173 | (2006.01) | |
| G02B 13/02 | (2006.01) | |
| G02B 15/20 | (2006.01) | |
| G02B 15/163 | (2006.01) | |
| G02B 5/00 | (2006.01) | |
| G02B 9/64 | (2006.01) | |

(Continued)

(52) U.S. Cl.
CPC .......... *G02B 15/173* (2013.01); *G02B 13/02* (2013.01); *G02B 15/20* (2013.01); *G02B 5/005* (2013.01); *G02B 9/62* (2013.01); *G02B 9/64* (2013.01); *G02B 13/009* (2013.01); *G02B 13/0045* (2013.01); *G02B 13/18* (2013.01); *G02B 15/14* (2013.01); *G02B 15/163* (2013.01); *G02B 27/0025* (2013.01)

(58) Field of Classification Search
CPC .. G02B 13/0045; G02B 27/0025; G02B 9/62; G02B 15/173; G02B 13/18; G02B 15/20; G02B 5/005; G02B 13/009; G02B 15/163; G02B 15/14; G02B 9/64; G02B 13/02
USPC ....... 359/676, 683–686, 713, 740, 755, 756, 359/766
See application file for complete search history.

(56) References Cited

U.S. PATENT DOCUMENTS

| | | |
|---|---|---|
| 9,110,278 B2 | 8/2015 | Sugita |
| 9,250,424 B2 | 2/2016 | Sugita |

(Continued)

FOREIGN PATENT DOCUMENTS

JP        2015191008 A    11/2015

*Primary Examiner* — Evelyn A Lester
(74) *Attorney, Agent, or Firm* — Carter, DeLuca & Farrell LLP

(57) ABSTRACT

The zoom lens of the present invention includes a positive lens unit LP (LULP) disposed closest to an object side, a negative lens unit LNF (LULNF) disposed at an image side of LULP, and an aperture stop disposed at image side of LULNF. The zoom lens further includes at image side of aperture stop, successively in order from object side to image side, a positive lens unit LP1, a negative lens unit LN1 (LULN1), a positive lens unit LP2 (LULP2), and a negative lens unit LN2 (LULN2), in which intervals between adjacent lens units are changed during zooming. LULN1 moves during focusing. The focal length and the total length of zoom lens at a telephoto end, the changing amount from interval between LULP2 and LULN2 at a wide angle end to that at telephoto end, and the total length of zoom lens at wide angle end are appropriately set.

13 Claims, 11 Drawing Sheets

(51) Int. Cl.
    *G02B 13/00*     (2006.01)
    *G02B 9/62*      (2006.01)
    *G02B 27/00*     (2006.01)
    *G02B 13/18*     (2006.01)

(56) References Cited

U.S. PATENT DOCUMENTS

| | | | |
|---|---|---|---|
| 9,253,382 B2 * | 2/2016 | Okumura | G02B 15/173 |
| 9,261,682 B2 * | 2/2016 | Ogata | G02B 27/64 |
| 9,268,118 B2 | 2/2016 | Sugita | |
| 9,268,119 B2 | 2/2016 | Sugita | |
| 9,285,571 B2 * | 3/2016 | Iwasawa | G02B 13/18 |
| 9,465,203 B2 | 10/2016 | Sugita | |
| 9,575,391 B2 | 2/2017 | Sugita | |
| 9,638,904 B2 | 5/2017 | Sugita | |
| 9,933,603 B2 | 4/2018 | Sugita | |
| 2006/0285224 A1 * | 12/2006 | Endo | G02B 7/008 359/689 |
| 2008/0218875 A1 | 9/2008 | Kuroda et al. | |
| 2011/0228406 A1 * | 9/2011 | Yamaguchi | G02B 15/173 359/683 |
| 2015/0153550 A1 | 6/2015 | Yamaguchi et al. | |
| 2015/0177498 A1 * | 6/2015 | Iwasawa | G02B 15/177 359/684 |
| 2017/0003486 A1 * | 1/2017 | Inoue | G02B 15/20 |
| 2017/0059834 A1 * | 3/2017 | Fujisaki | G02B 15/20 |
| 2017/0242228 A1 | 8/2017 | Sugita | |
| 2017/0322399 A1 * | 11/2017 | Sugita | G02B 15/163 |
| 2017/0351113 A1 | 12/2017 | Inoue et al. | |
| 2018/0039051 A1 * | 2/2018 | Kimura | G02B 15/173 |
| 2018/0180859 A1 | 6/2018 | Sugita | |
| 2018/0275370 A1 | 9/2018 | Sugita | |
| 2018/0275382 A1 | 9/2018 | Sugita | |
| 2019/0004296 A1 * | 1/2019 | Sugita | G02B 15/173 |
| 2019/0271829 A1 * | 9/2019 | Hatada | G02B 15/14 |

* cited by examiner

ZOOM LENS AND IMAGE PICKUP APPARATUS

BACKGROUND OF THE INVENTION

Field of the Invention

The present invention relates to a zoom lens and an image pickup apparatus and is advantageously applicable to an image pickup optical system for use in an image pickup apparatus such as a digital camera, a video camera, a TV camera, or a surveillance camera.

Description of the Related Art

For use in image pickup apparatuses (or cameras), image pickup optical systems having various focal lengths and apertures are demanded depending on purposes. For example, what is required from a telephoto zoom lens capable of enlarging and imaging a faraway subject at a desired angle of view is to, for example, offer high image quality, have a short total length of the zoom lens and a high zoom ratio, and be capable of speedy focusing. As a zoom lens meeting these demands, there is known a zoom lens which is of a positive lead type, meaning that a lens unit having a positive refractive power is disposed closest to the object side, and is of a rear focusing type, meaning that a lens unit except for the first lens unit on the object side performs focusing (U.S. Patent Application Publication No. 2015/0153550 and Japanese Patent Application Laid-Open No. 2015-191008).

U.S. Patent Application Publication No. 2015/0153550 discloses a zoom lens consisting of, in order from the object side to the image side, a first lens unit to a fourth lens unit having positive, negative, positive, and positive refractive powers, respectively. During zooming, intervals between adjacent ones of the lens units are changed, and during focusing, a lens system included in the first lens unit moves. Japanese Patent Application Laid-Open No. 2015-191008 discloses a zoom lens consisting of, in order from the object side to the image side, a first lens unit to a sixth lens unit having positive, negative, positive, negative, positive, and negative refractive powers, respectively. During zooming, intervals between adjacent ones of the lens units are changed, and during focusing, the sixth lens unit moves.

There is also known a so-called mirrorless zoom lens which sets a short back focus and has no mechanical parts between the last lens surface to the image plane to shorten the total length of the zoom lens and the lens barrel diameter (U.S. Patent Application Publication No. 2008/0218875). U.S. Patent Application Publication No. 2008/0218875 discloses a zoom lens consisting of, in order from the object side to the image side, a first lens unit to a sixth lens unit having positive, negative, positive, negative, positive, and negative refractive powers, respectively. During zooming, intervals between adjacent ones of the lens units are changed, and during focusing, the fourth lens unit moves.

Characteristics strongly demanded of a zoom lens for use in an image pickup apparatus include being small in total lens size and having a small, lightweight focusing lens unit so that focusing may not cause large aberration variation. Characteristics strongly demanded of a telephoto zoom lens include having a short total length of the zoom lens.

With a positive lead type zoom lens, it is relatively easy to achieve a predetermined zoom ratio and size reduction of the zoom lens. However, to achieve high optical performance over the entire zoom range and the entire object distance range, it is important to appropriately set the number of lens units, the refractive powers of the lens units, moving conditions for the lens units in zooming, selection of a lens unit for focusing, and the like.

SUMMARY OF THE INVENTION

A zoom lens according to an aspect of the present invention includes a lens unit LP having a positive refractive power and disposed closest to an object side, a lens unit LNF having a negative refractive power and disposed at an image side of the lens unit LP, and an aperture stop disposed at the image side of the lens unit LNF, the zoom lens further including a lens unit LP1 having a positive refractive power, a lens unit LN1 having a negative refractive power, a lens unit LP2 having a positive refractive power, and a lens unit LN2 having a negative refractive power successively arranged in order from the object side to the image side, at the image side of the aperture stop, in which intervals between adjacent ones of the lens units are changed during zooming. The lens unit LN1 moves during focusing. The zoom lens satisfies the following conditional expressions:

$$0.40 < ft/Tdt < 1.20, \text{ and}$$

$$0.05 < -\Delta LPN2/Tdw < 0.30,$$

where ft represents a focal length of the zoom lens at a telephoto end, Tdt represents a total length of the zoom lens at the telephoto end, Tdw represents a total length of the zoom lens at a wide angle end, and $\Delta LPN2$ represents an amount of change from a lens unit interval between the lens unit LP2 and the lens unit LN2 at the wide angle end to a lens unit interval between the lens unit LP2 and the lens unit LN2 at the telephoto end, $\Delta LPN2$ having a positive sign when the lens unit interval is larger at the telephoto end than at the wide angle end and having a negative sign when the lens unit interval is smaller at the telephoto end than at the wide angle end.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. A zoom lens of each Example includes a lens unit LP having a positive refractive power and disposed closest to the object side, a lens unit LNF having a negative refractive power and disposed at the image side of the lens unit LP, and an aperture stop disposed at the image side of the lens unit LNF. At the image side of the aperture stop, the zoom lens further includes, successively in order from the object side to the image side, a lens unit LP1 having a positive refractive power, a lens unit LN1 having a negative refractive power, a lens unit LP2 having a positive refractive power, and a lens unit LN2 having a negative refractive power. During zooming, intervals between adjacent ones of the lens units are changed. During focusing, the lens unit LN1 moves.

Figure 1:
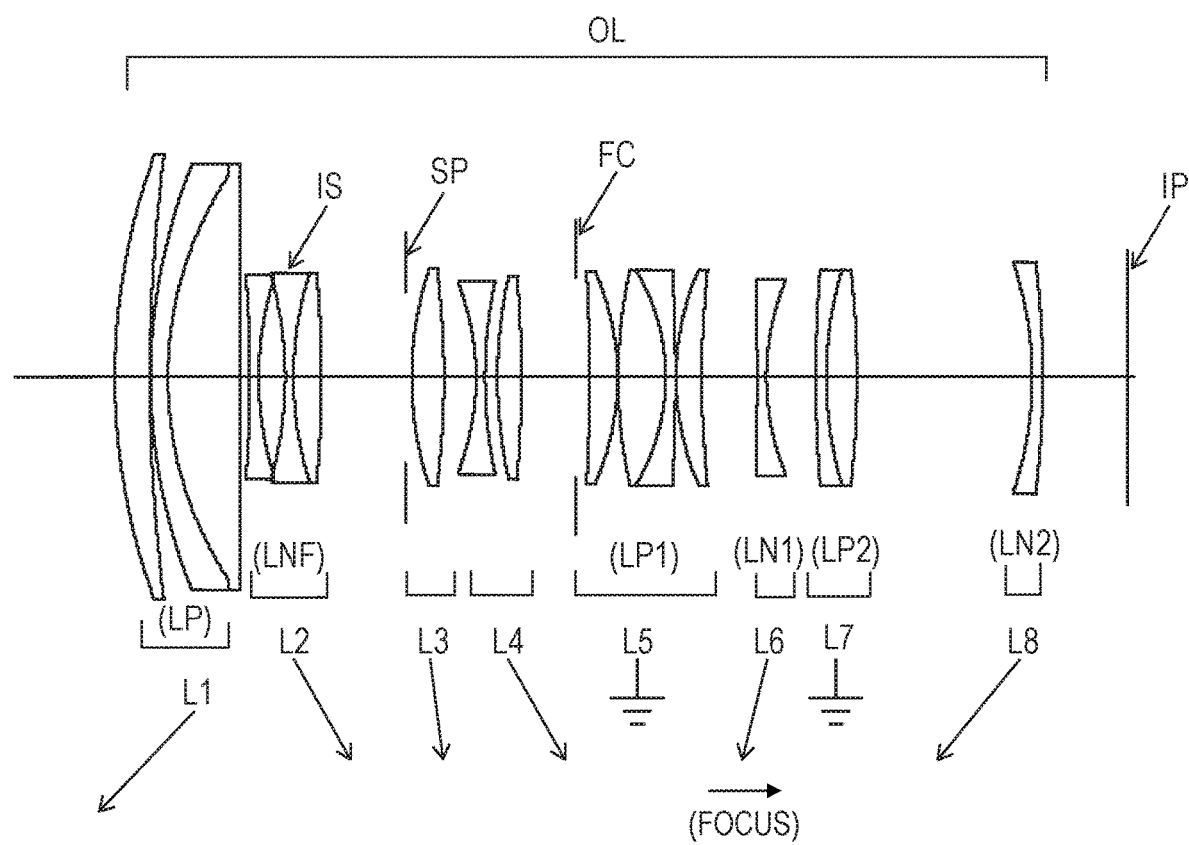
FIG. 1 is a sectional view of a zoom lens of Example 1 at a wide angle end.
Figure 2A:
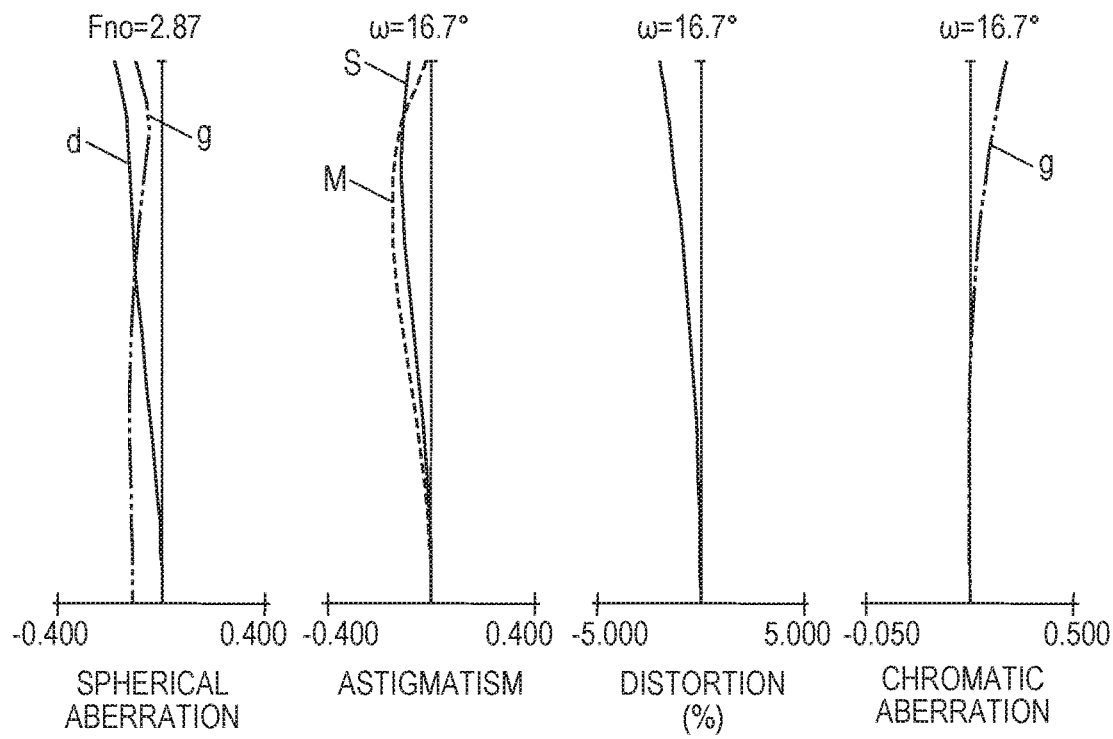
FIG. 2A is an aberration diagram of the zoom lens of Example 1 focused at infinity at the wide angle end.
Figure 2B:
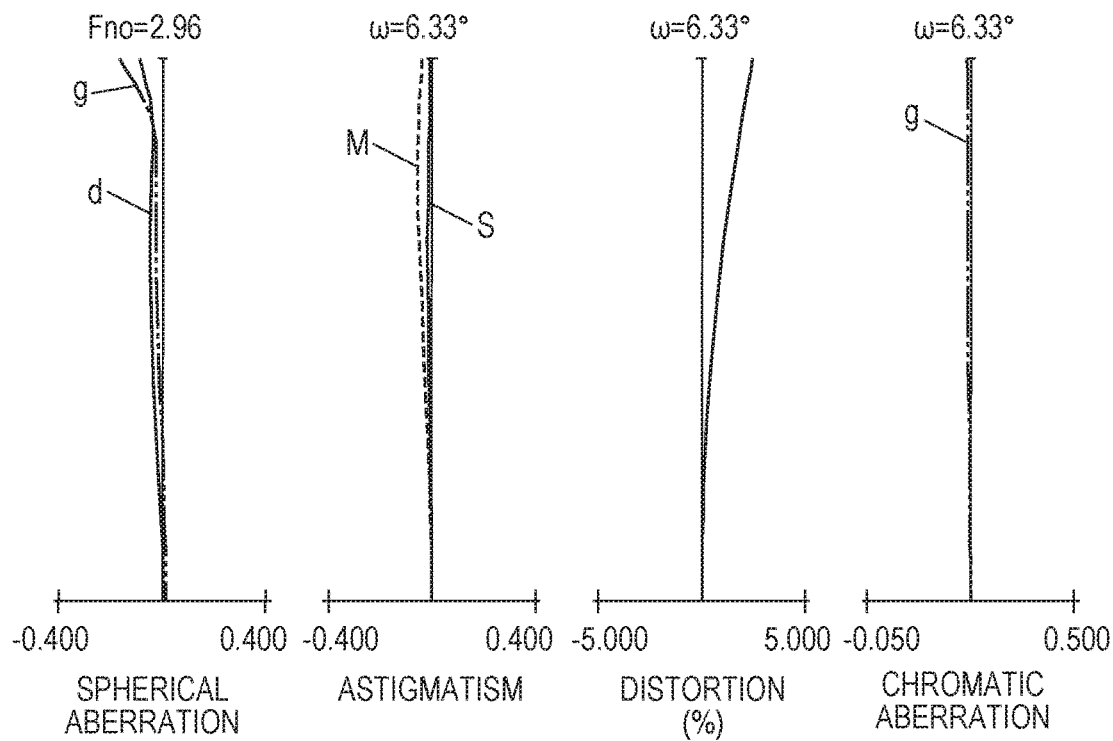
FIG. 2B is an aberration diagram of the zoom lens of Example 1 focused at infinity at a telephoto end.
Figure 3:
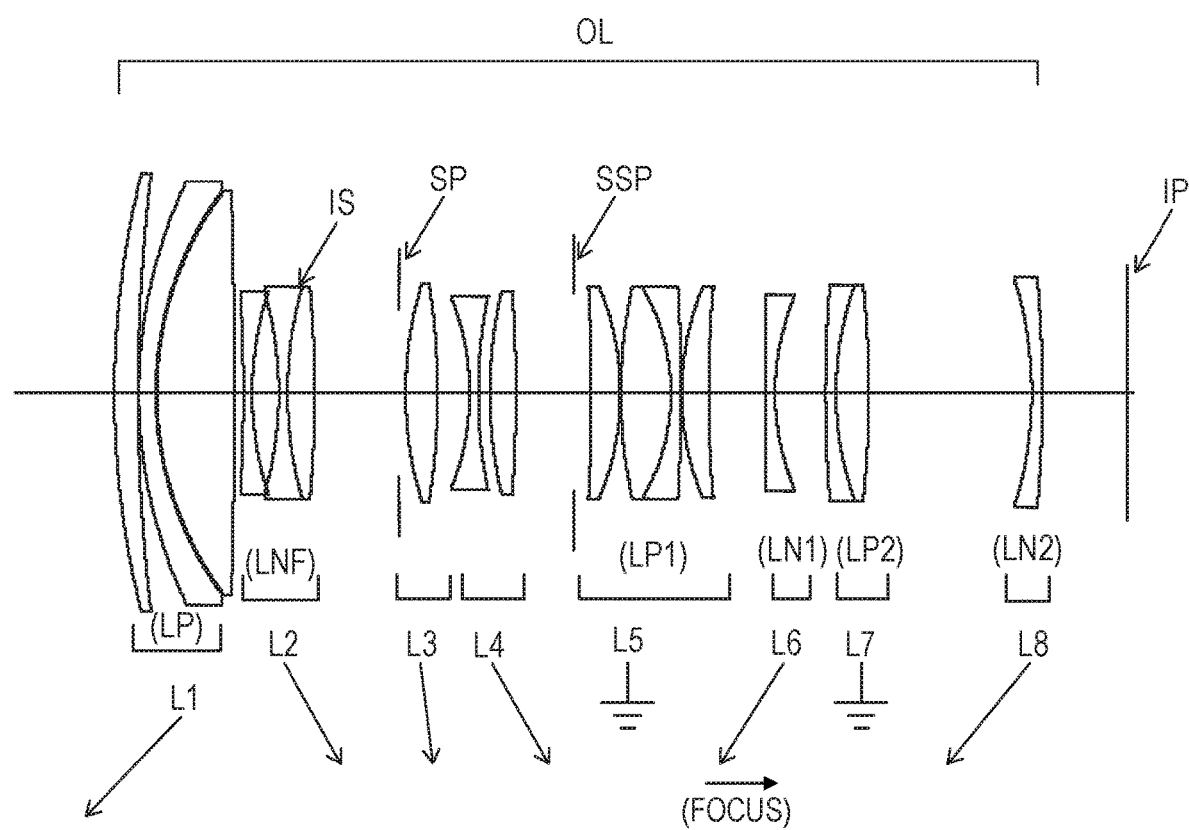
FIG. 3 is a sectional view of a zoom lens of Example 2 at the wide angle end.
Figure 4A:
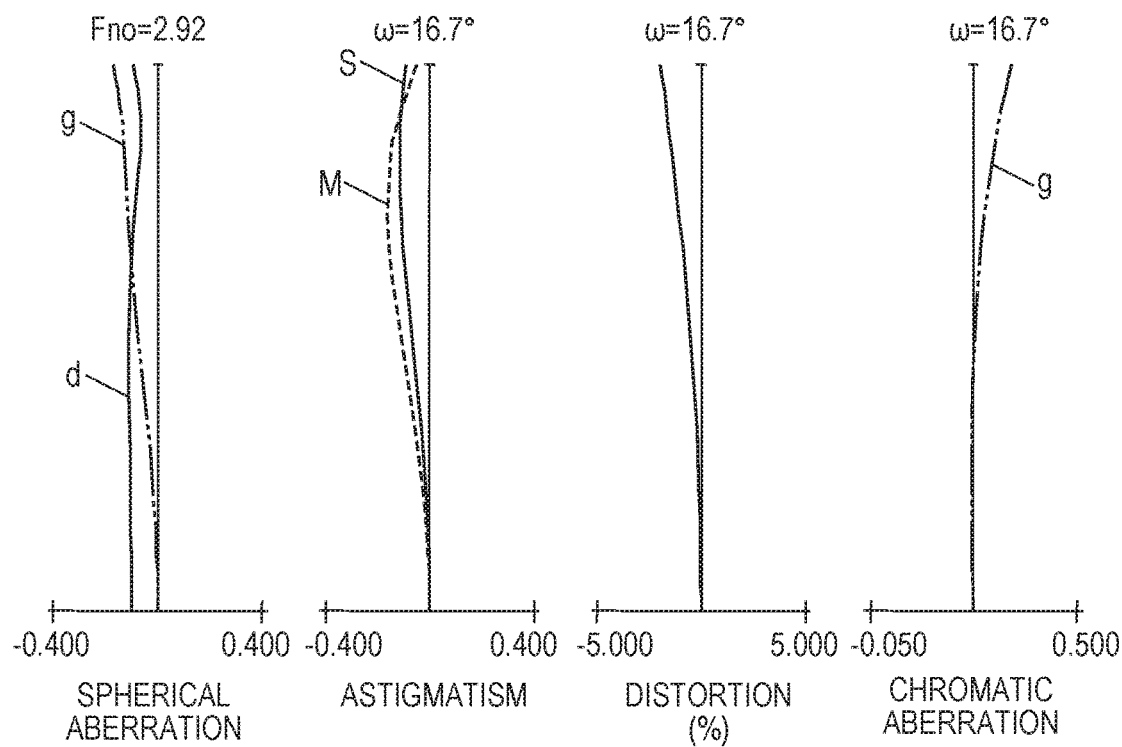
FIG. 4A is an aberration diagram of the zoom lens of Example 2 focused at infinity at the wide angle end.
Figure 4B:
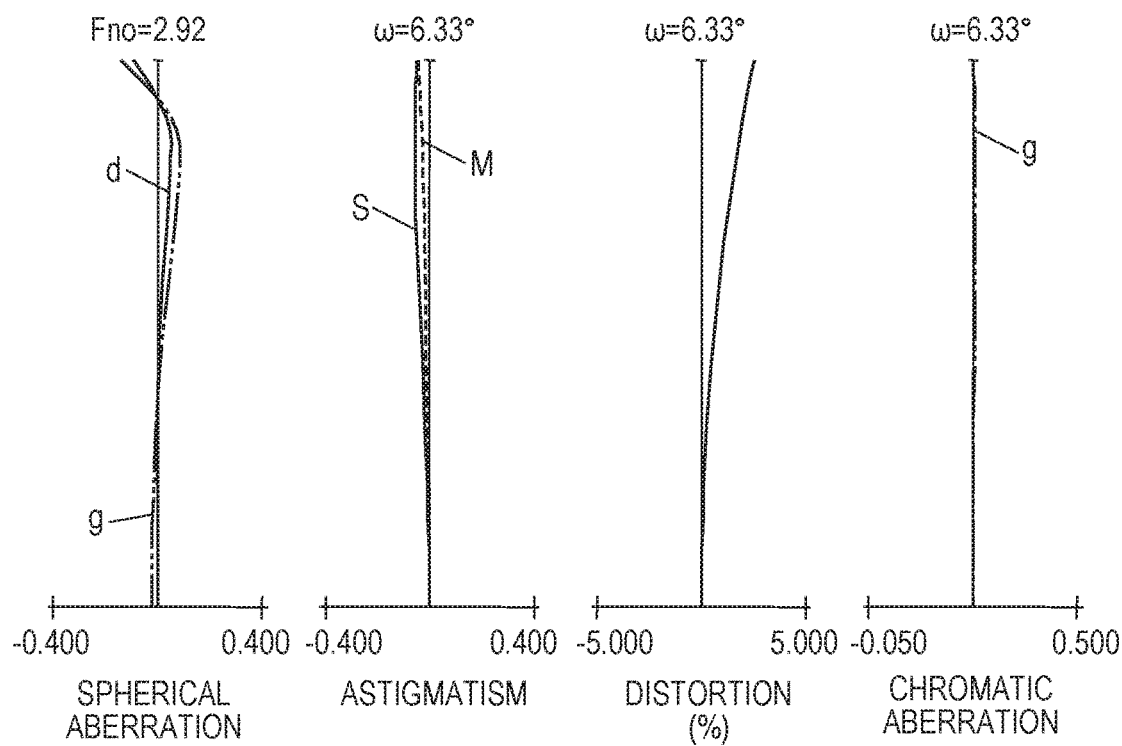
FIG. 4B is an aberration diagram of the zoom lens of Example 2 focused at infinity at the telephoto end.

FIG. 1 is a lens sectional view of a zoom lens of Example 1 at the wide angle end. FIGS. 2A and 2B are aberration diagrams of the zoom lens of Example 1 focused at infinity at the wide angle end and at the telephoto end, respectively. The zoom lens of Example 1 has a zoom ratio of 2.71 and an F-number of 2.87 to 2.96. FIG. 3 is a lens sectional view of a zoom lens of Example 2 at the wide angle end. FIGS. 4A and 4B are aberration diagrams of the zoom lens of Example 2 focused at infinity at the wide angle end and at the telephoto end, respectively. The zoom lens of Example 2 has a zoom ratio of 2.71 and an F-number of 2.92.

Figure 5:
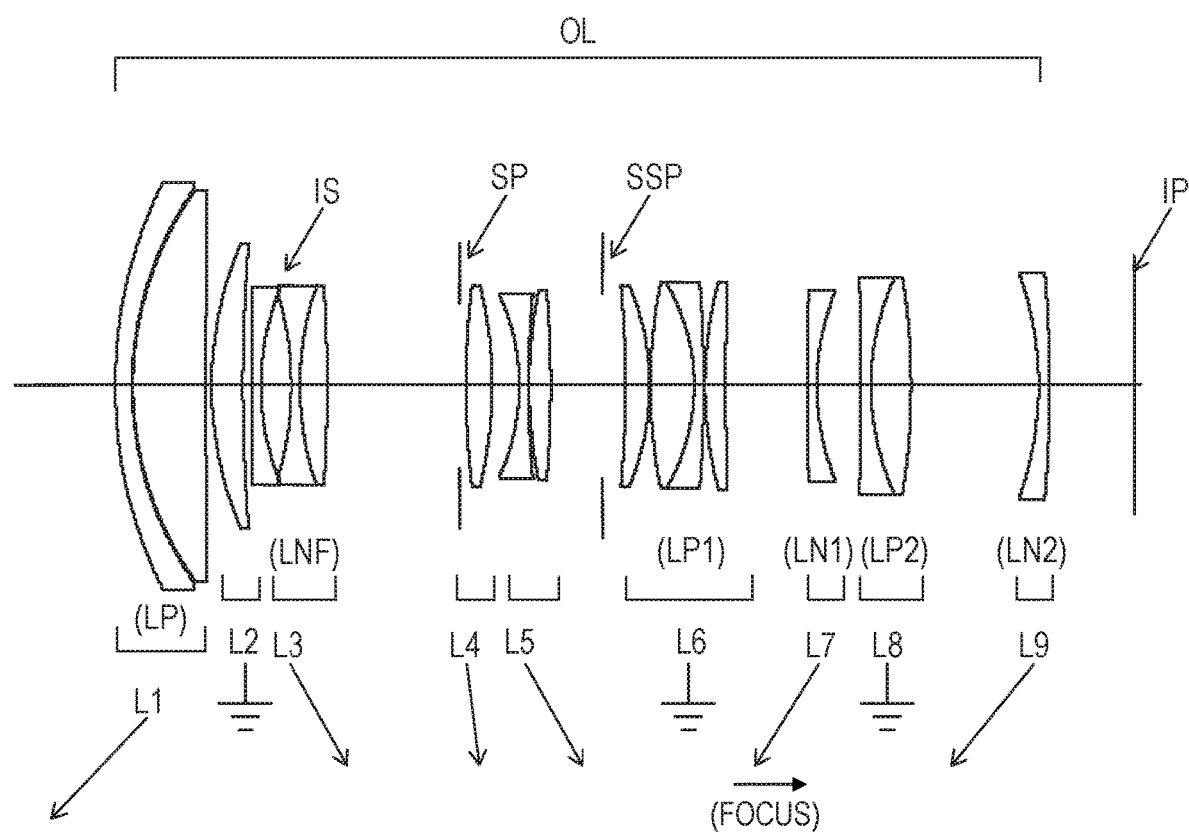
FIG. 5 is a sectional view of a zoom lens of Example 3 at the wide angle end.
Figure 6A:
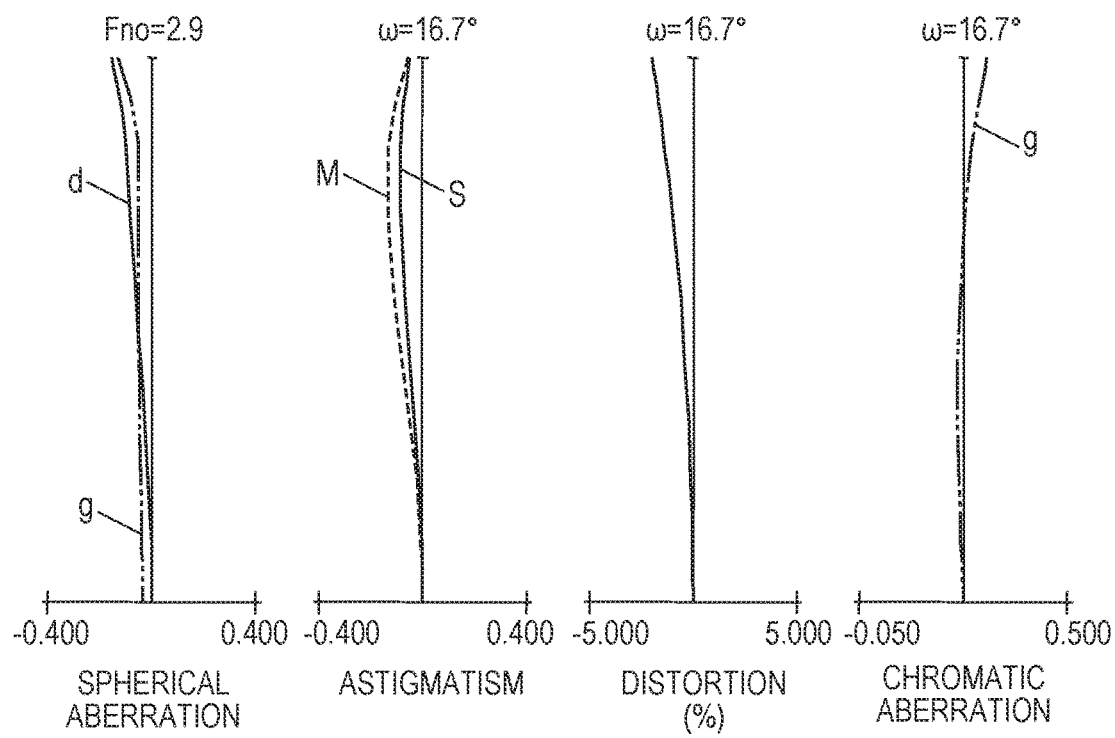
FIG. 6A is an aberration diagram of the zoom lens of Example 3 focused at infinity at the wide angle end.
Figure 6B:
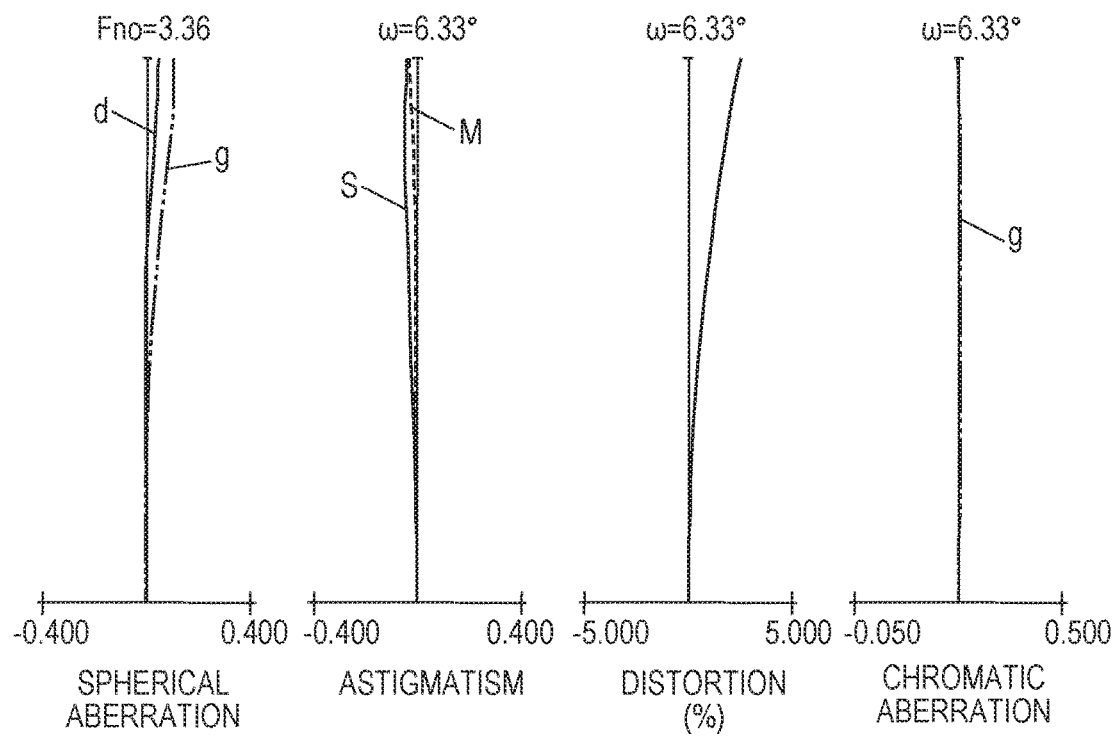
FIG. 6B is an aberration diagram of the zoom lens of Example 3 focused at infinity at the telephoto end.
Figure 7:
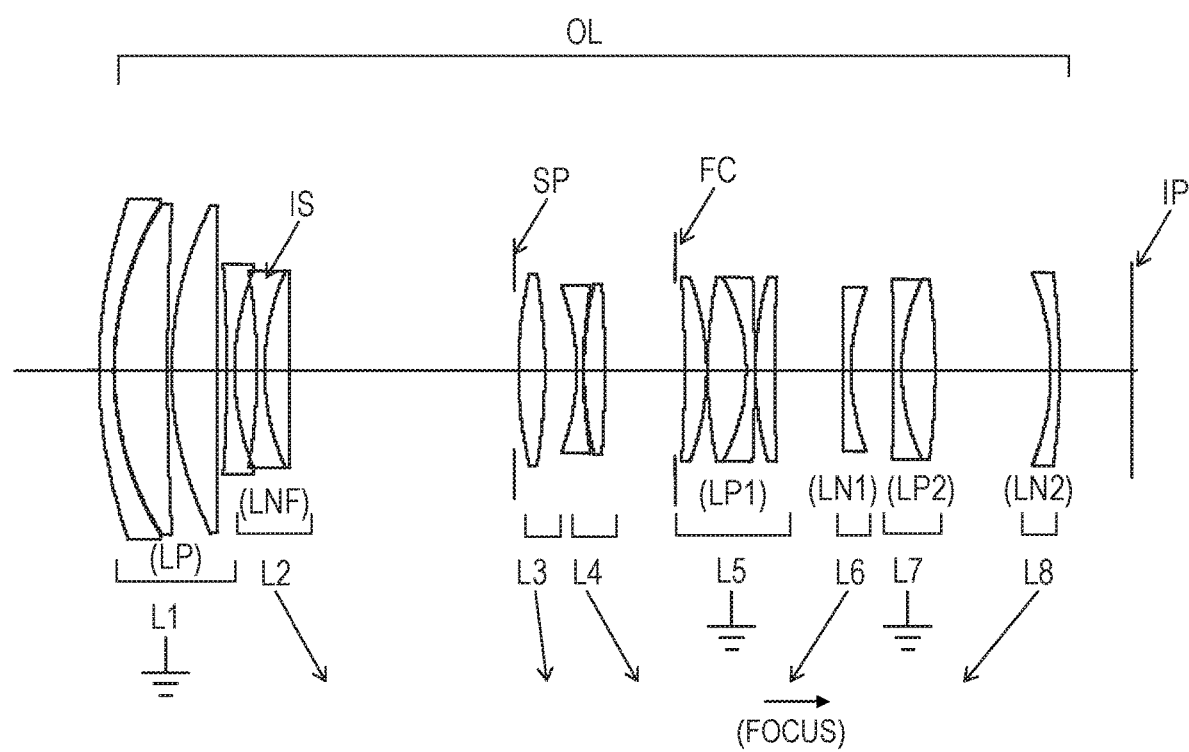
FIG. 7 is a sectional view of a zoom lens of Example 4 at the wide angle end.
Figure 8A:
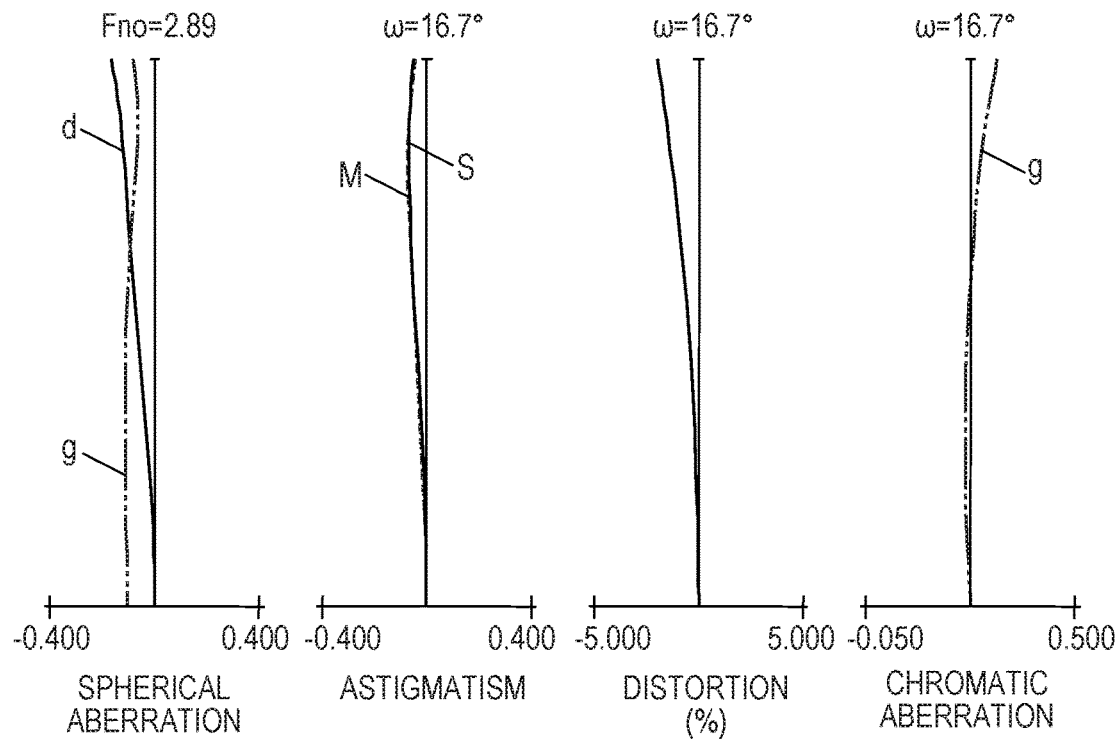
FIG. 8A is an aberration diagram of the zoom lens of Example 4 focused at infinity at the wide angle end.
Figure 8B:
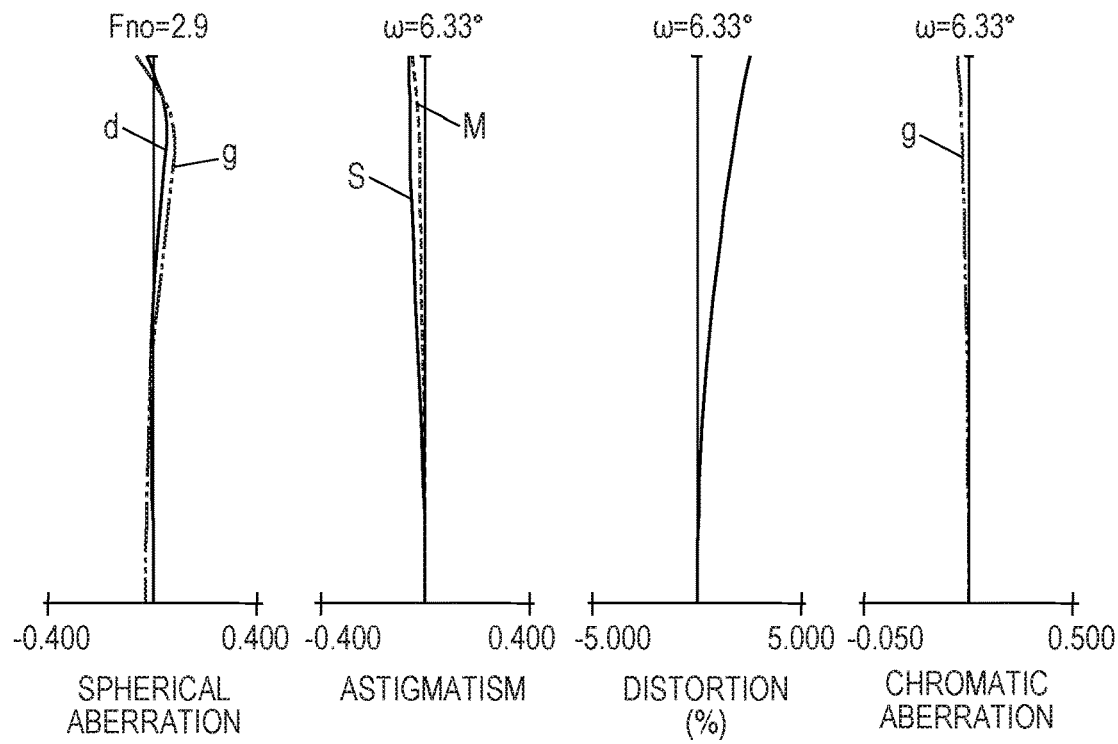
FIG. 8B is an aberration diagram of the zoom lens of Example 4 focused at infinity at the telephoto end.

FIG. 5 is a lens sectional view of a zoom lens of Example 3 at the wide angle end. FIGS. 6A and 6B are aberration diagrams of the zoom lens of Example 3 focused at infinity at the wide angle end and at the telephoto end, respectively. The zoom lens of Example 3 has a zoom ratio of 2.71 and an F-number of 2.90. FIG. 7 is a lens sectional view of a zoom lens of Example 4 at the wide angle end. FIGS. 8A and 8B are aberration diagrams of the zoom lens of Example 4 focused at infinity at the wide angle end and at the telephoto end, respectively. The zoom lens of Example 4 has a zoom ratio of 2.71 and an F-number of 2.89 to 3.35.

Figure 9:
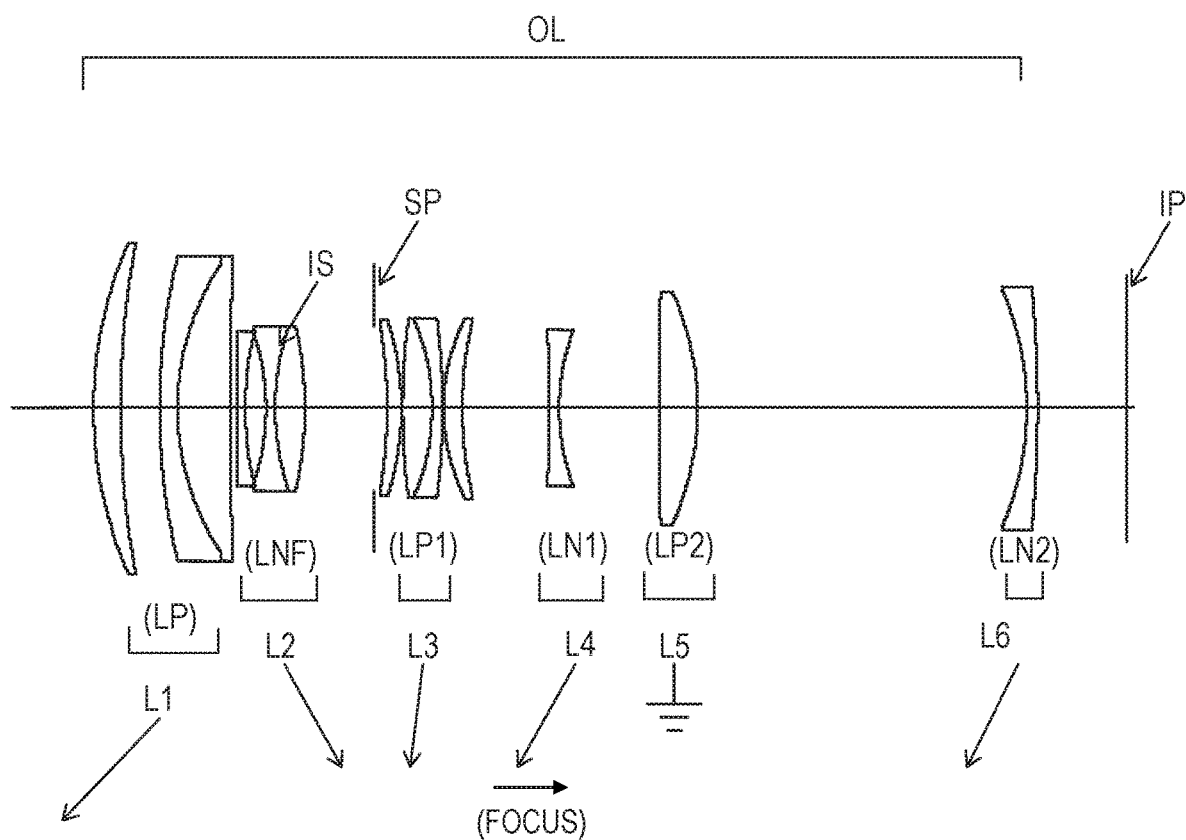
FIG. 9 is a sectional view of a zoom lens of Example 5 at the wide angle end.
Figure 10A:
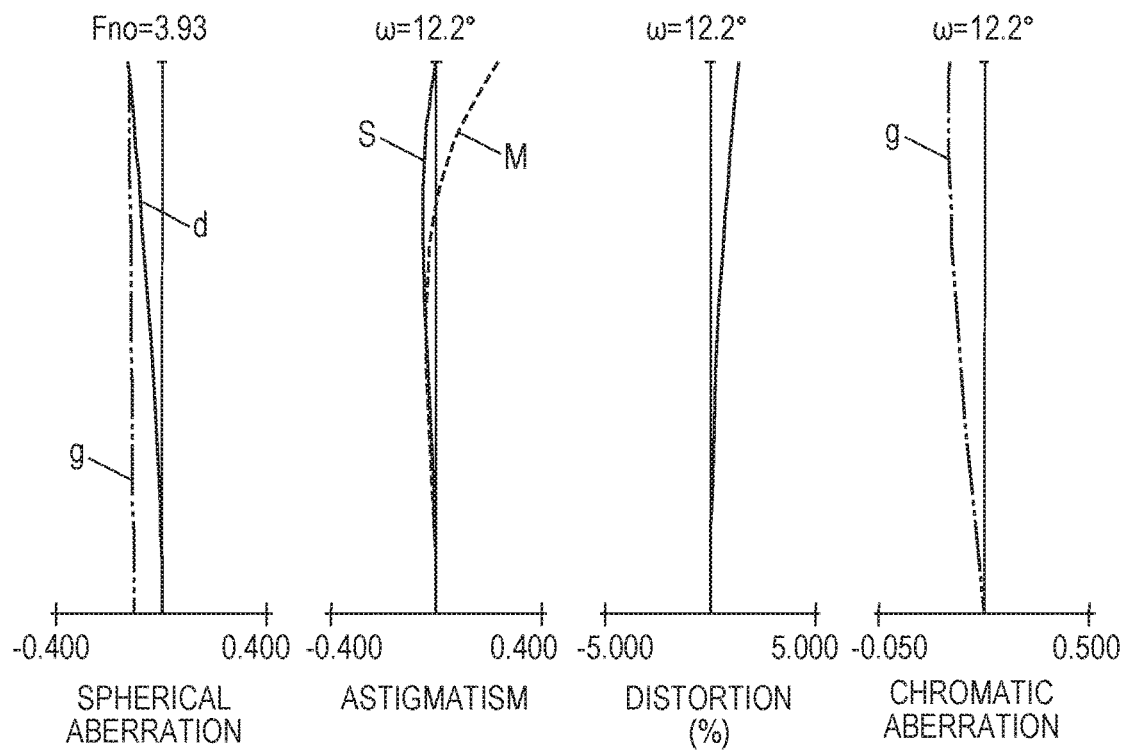
FIG. 10A is an aberration diagram of the zoom lens of Example 5 focused at infinity at the wide angle end.
Figure 10B:
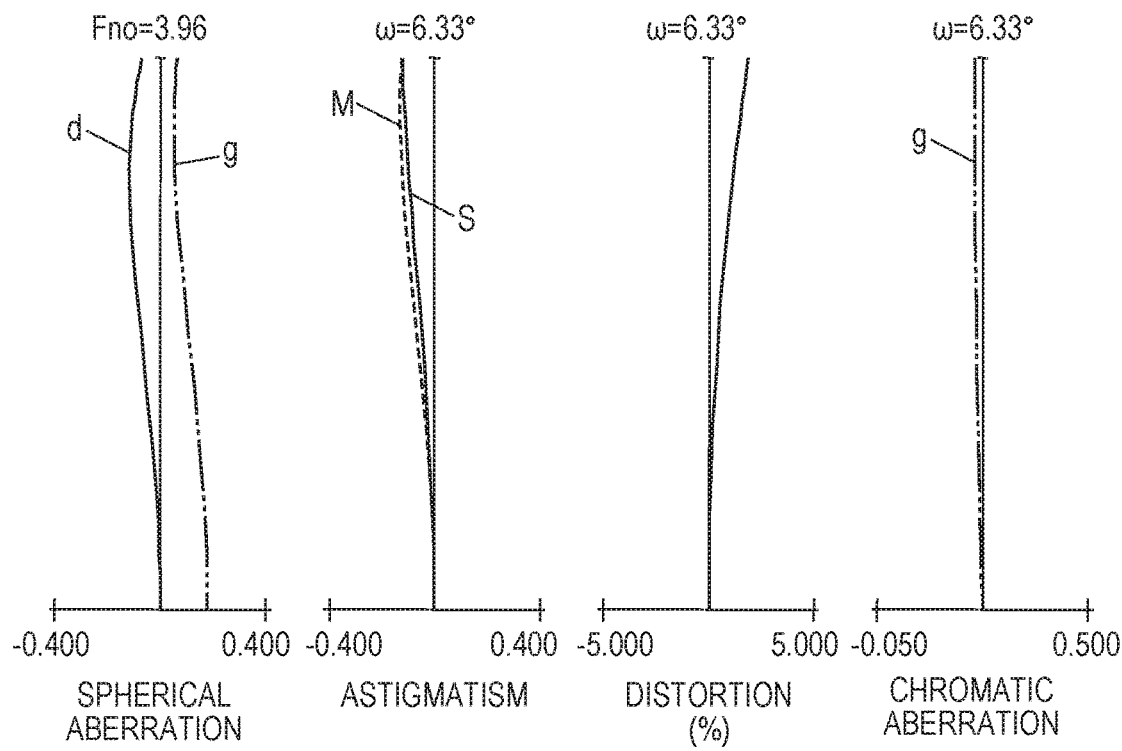
FIG. 10B is an aberration diagram of the zoom lens of Example 5 focused at infinity at the telephoto end.
Figure 11:
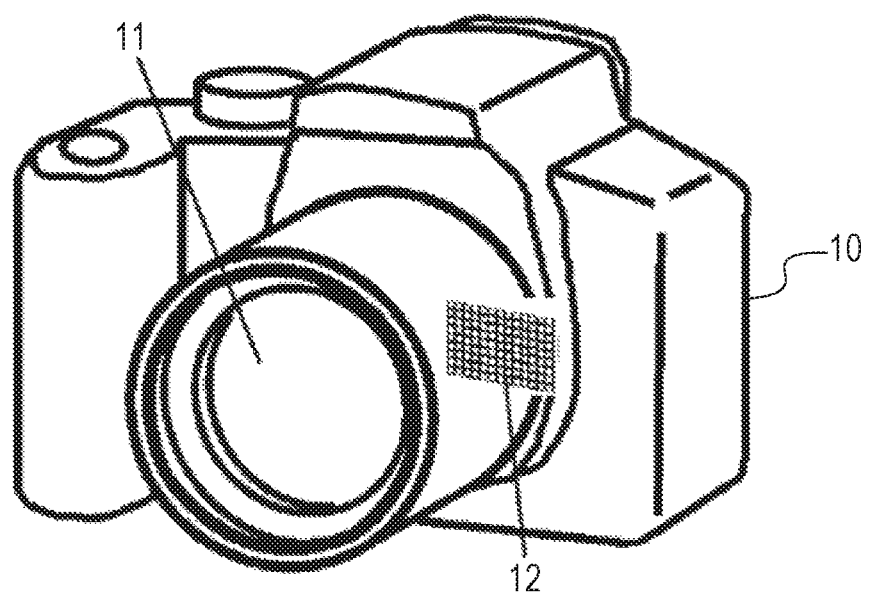
FIG. 11 is a schematic view of a main part of an image pickup apparatus.

FIG. 9 is a lens sectional view of a zoom lens of Example 5 at the wide angle end. FIGS. 10A and 10B are aberration diagrams of the zoom lens of Example 5 focused at infinity at the wide angle end and at the telephoto end, respectively. The zoom lens of Example 5 has a zoom ratio of 1.95 and an F-number of 3.93 to 3.96. FIG. 11 is a schematic diagram of a main part of an image pickup apparatus.

The zoom lens of each Example is an image pickup optical system for use in an image pickup apparatus such as a video camera or a digital camera. In each lens sectional view, the left hand is the object side (or the front side), and the right hand is the image side (or the rear side). Note that the zoom lens of each Example may be used for a projector, in which case the left hand is the screen side, and the right hand is the projected image side.

In each lens sectional view, OL represents a zoom lens. The order of a lens unit from the object side is represented by i, and the i-th lens unit is represented by Li. An aperture stop for light quantity adjustment is represented by SP, a flare cut aperture (FC aperture) having a fixed aperture diameter is represented by FC, and an image plane is represented by IP. The image plane corresponds to the imaging plane of a solid-state image pickup element (a photo-electric conversion element) such as a CCD or CMOS sensor when the zoom lens is used as an imaging optical system for a video camera or a digital still camera. In each lens sectional view, the solid arrows indicate the loci along which the lens units move in zooming from the wide angle end to the telephoto end when focused at infinity. The arrow indicated by FOCUS indicates the direction in which a lens unit moves during focusing from infinity to a close distance.

In each aberration diagram, in the part showing spherical aberration, the solid line d denotes d-line, and the chain double-dashed line g denotes g-line. In the part showing astigmatism, the dot line M denotes the meridional image plane for d-line, and the solid line S denotes the sagittal image plane for d-line. Further, the part showing distortion indicates d-line distortion. Lateral chromatic aberration is presented for g-line. "Fno" represents an F-number, and "ω" represents a half angle of view. Note that in each Example below, the wide angle end and the telephoto end refer to zoom positions which are available ends of the zoom range in which the magnification-varying lens units can move on an optical axis mechanically.

Zoom lenses of Examples 1, 2, and 4 each include, in order from the object side to the image side, a first lens unit L1 having a positive refractive power, a second lens unit L2 having a negative refractive power, an aperture stop SP, a third lens unit L3 having a positive refractive power, a fourth lens unit L4 having a negative refractive power, a fifth lens unit L5 having a positive refractive power, a sixth lens unit L6 having a negative refractive power, a seventh lens unit L7 having a positive refractive power, and an eighth lens unit L8 having a negative refractive power.

The first lens unit L1 corresponds to the lens unit LP, the second lens unit L2 corresponds to the lens unit LNF, the fifth lens unit L5 corresponds to the lens unit LP1, the sixth lens unit L6 corresponds to the lens unit LN1, the seventh lens unit L7 corresponds to the lens unit LP2, and the eighth lens unit L8 corresponds to the lens unit LN2.

In Examples 1 and 2, during zooming from the wide angle end to the telephoto end, the first lens unit L1, the sixth lens unit L6, and the eighth lens unit L8 move to the object side, and the second lens unit L2, the third lens unit L3, and the fourth lens unit L4 move to the image side. The fifth lens unit L5 and the seventh lens unit L7 do not move. During focusing from infinity to a close distance, the sixth lens unit L6 moves to the image side.

In Example 4, during zooming from the wide angle end to the telephoto end, the sixth lens unit L6 and the eighth lens unit L8 move to the object side, and the second lens unit L2, the third lens unit L3, and the fourth lens unit L4 move to the image side. The first lens unit L1, the fifth lens unit L5, and the seventh lens unit L7 do not move. During focusing from infinity to a close distance, the sixth lens unit L6 moves to the image side.

The zoom lens of Example 3 includes, from the object side to the image side, a first lens unit L1 having a positive refractive power, a second lens unit L2 having a positive refractive power, a third lens unit L3 having a negative refractive power, an aperture stop SP, a fourth lens unit L4 having a positive refractive power, a fifth lens unit L5 having a negative refractive power, a sixth lens unit L6 having a positive refractive power, a seventh lens unit L7 having a negative refractive power, an eighth lens unit L8 having a positive refractive power, and a ninth lens unit L9 having a negative refractive power.

The first lens unit L1 corresponds to the lens unit LP, the third lens unit L3 corresponds to the lens unit LNF, the sixth lens unit L6 corresponds to the lens unit LP1, the seventh lens unit L7 corresponds to the lens unit LN1, the eighth lens unit L8 corresponds to the lens unit LP2, and the ninth lens unit L9 corresponds to the lens unit LN2.

In Example 3, during zooming from the wide angle end to the telephoto end, the first lens unit L1, the seventh lens unit L7, and the ninth lens unit L9 move to the object side, and the third lens unit L3, the fourth lens unit L4, and the fifth lens unit L5 move to the image side. The second lens unit L2, the sixth lens unit L6, and the eighth lens unit L8 do not move. During focusing from infinity to a close distance, the seventh lens unit L7 moves to the image side.

The zoom lens of Example 5 includes, from the object side to the image side, a first lens unit L1 having a positive refractive power, a second lens unit L2 having a negative refractive power, an aperture stop SP, a third lens unit L3 having a positive refractive power, a fourth lens unit L4 having a negative refractive power, a fifth lens unit L5 having a positive refractive power, and a sixth lens unit L6 having a negative refractive power. The first lens unit L1 corresponds to the lens unit LP, the second lens unit L2 corresponds to the lens unit LNF, the third lens unit L3 corresponds to the lens unit LP1, the fourth lens unit L4 corresponds to the lens unit LN1, the fifth lens unit L5 corresponds to the lens unit LP2, and the sixth lens unit L6 corresponds to the lens unit LN2.

In Example 5, during zooming from the wide angle end to the telephoto end, the first lens unit L1, the third lens unit L3, the fourth lens unit L4, and the sixth lens unit L6 move to the object side, and the second lens unit L2 moves to the image side. The fifth lens unit L5 does not move. During focusing from infinity to a close distance, the fourth lens unit L4 moves to the image side.

Next, characteristics of the zoom lens of each Example are described. In the magnification-varying optical system of U.S. Patent Application Publication No. 2015/0153550, the second lens unit provides main magnification-varying effect by moving to the image side during zooming such that the interval between the second lens unit and the first lens unit is changed. To shorten the total length of the zoom lens, the second lens unit needs to move less during zooming, and to compensate for this, other lens units need to assist in the zooming.

Specifically, points to be noted are the fourth lens unit with a positive refractive power being a relay lens unit and image-side space corresponding to the back focus.

As the zoom lens of Japanese Patent Application Laid-Open No. 2015-191008, in a telephoto zoom lens in which the first lens unit moves a long distance to the object side during zooming, main zooming effect is produced by the change in the interval between the first lens unit and the second lens unit due to the movement of the first lens unit. To shorten the total length of the zoom lens at the telephoto end, the first lens unit needs to move less during zooming, and to compensate for this, other lens units need to assist in the zooming. Specifically, a point to be noted is the image-side space corresponding to the back focus.

In U.S. Patent Application Publication No. 2015/0153550, the first lens unit is divided into two lens units having positive refractive powers, and the image-side one of the two lens units performs focusing. This configuration, however, is likely to increase the number of lenses that make the effective diameter large. Regardless of whether the zoom lens has a fixed total length of the zoom lens or a variable total length of the zoom lens, in order to be reduced in weight, it is preferable that the zoom lens employs rear focusing with a focusing lens unit having a negative refractive power, as the one in Japanese Patent Application Laid-Open No. 2015-191008.

In a zoom lens with a long back focus, when the height h of axial rays incident on this lens unit having a negative refractive power is too high, spherical aberration varies greatly during zooming. For this reason, the last lens unit on the image side performs focusing. However, a zoom lens with a short back focus has space left at the image side of the focusing lens unit.

The inventor of the present invention has found that the assistance in magnification-varying can be achieved by newly disposing, in this space, a lens unit having a positive refractive power and a lens unit having a negative refractive power and by driving the zoom lens so that the interval between these two lens units reduces.

The zoom lens of each Example causes a lens unit having a negative refractive power and disposed closer to the image side than the aperture stop to perform focusing, and also newly disposes a lens unit having a positive refractive power and a lens unit having a negative refractive power in the image-side space as a short back focus to have them assist in magnification-varying. This allows the first lens unit and the second lens unit, which perform main magnification-varying, to move less during zooming to shorten the total length of the zoom lens, and at the same time, allows high optical performance to be offered.

The zoom lens of each Example satisfies the following conditional expressions:

$$0.40 < ft/Tdt < 1.20, \text{ and} \qquad (1)$$

$$0.05 < -\Delta LPN2/Tdw < 0.30, \qquad (2)$$

where ft represents the focal length of the zoom lens at the telephoto end, Tdt represents the total length of the zoom lens at the telephoto end, $\Delta LPN2$ represents the amount of change from the interval between the lens unit LP2 and the lens unit LN2 at the wide angle end to the interval between the lens unit LP2 and the lens unit LN2 at the telephoto end (the amount of change in the lens unit interval has a positive sign when the lens unit interval is larger at the telephoto end than at the wide angle end and has a negative sign when the lens unit interval is smaller at the telephoto end than at the wide angle end), and Tdw represents the total length of the zoom lens at the wide angle end.

Next, technical meanings of the above conditional expressions are described. When the zoom lens is outside the numerical range set by Conditional Expression (1), the height h of axial rays incident on the first lens unit is not sufficiently high. Thus, it is difficult to shorten the total length of the zoom lens and obtain high optical performance.

It is preferable to set the numerical values in Conditional Expression (1) as follows:

$$0.50 < ft/Tdt < 1.00. \qquad (1a)$$

In the zoom lens of each Example, the interval between the lens unit LP1 and the lens unit LN1 and the interval between the lens unit LP2 and the lens unit LN2 are both reduced during zooming from the wide angle end to the telephoto end. The interval between the lens unit LP1 and the lens unit LN1 and the interval between the lens unit LP2 and the lens unit LN2 are effectively changed during zooming, so that they assist in the magnification-varying. Accordingly, this reduces the magnification-varying shares of the first lens unit L1 and the second lens unit L2, achieves reduction in the total length of the zoom lens and the weight of the zoom lens, and also offers high optical performance.

In the present invention, the lens unit LP2 and the lens unit LN2 are disposed closer to the image side than the focusing lens unit (the lens unit LN1), and the interval between the lens unit LP2 and the lens unit LN2 is changed to effectively assist in the magnification-varying.

Conditional Expression (2) defines a change in the interval between the lens unit LP2 and the lens unit LN2 regarding the above-described structure. Conditional Expression (2) is defined to appropriately change the interval between the lens unit LP2 and the lens unit LN2 during zooming so that they effectively assist in the magnification-varying.

If the ratio exceeds the upper limit value in Conditional Expression (2), the change in the interval between the lens unit LP2 and the lens unit LN2 is too large, which increases the height h of axial rays incident on the focusing lens unit (the lens unit LN1) and thus increases variation in spherical aberration due to focusing, it is not preferable. When the ratio falls below the lower limit value in Conditional Expression (2), the change in the interval between the lens unit LP2 and the lens unit LN2 during zooming is small, which makes their magnification-varying assistance less effective, it is not preferable.

It is more preferable to set the numerical values in Conditional Expression (2) as follows:

$$0.08 < -\Delta LPN2/Tdw < 0.20. \quad (2a)$$

As described above, a zoom lens with a short total length of the zoom lens at the telephoto end, a small weight, a high optical performance, and a short back focus can be obtained according to the present invention.

Next, descriptions are given of more preferable conditions for each Example. It is preferable that the zoom lens of each Example satisfies at least one of the following conditional expressions:

$$0.02 < -\Delta M_{LN1}/Tdw < 0.10, \quad (3)$$

$$0.05 < -\Delta M_{LN2}/Tdw < 0.30, \quad (4)$$

$$0.40 < -f_{LP2}/f_{LN2} < 1.50, \quad (5)$$

$$0.10 < f_{LP1}/ft < 0.40, \quad (6)$$

$$0.10 < -f_{LN1}/ft < 0.50, \quad (7)$$

$$0.30 < f_{LP2}/ft < 1.00, \text{ and} \quad (8)$$

$$0.40 < -f_{LN2}/ft < 1.50, \quad (9)$$

where $\Delta M_{LN1}$ represents a moving amount by which the lens unit LN1 moves in zooming from the wide angle end to the telephoto end, $\Delta M_{LN2}$ represents a moving amount by which the lens unit LN2 moves in zooming from the wide angle end to the telephoto end, $f_{LP2}$ represents the focal length of the lens unit LP2, $f_{LN2}$ represents the focal length of the lens unit LN2, $f_{LP1}$ represents the focal length of the lens unit LP1, and $f_{LN1}$ represents the focal length of the lens unit LN1. The moving amount by which a lens unit moves represents the difference in the position of the lens unit on the optical axis between the wide angle end and the telephoto end. The moving amount has a positive sign when the lens unit is located closer to the image side at the telephoto end than at the wide angle end, and has a negative sign when the lens unit is located closer to the object side at the telephoto end than at the wide angle end.

Next, technical meanings of the above conditional expressions are described. Conditional Expression (3) is defined to shorten the total length of the zoom lens, and to reduce variation in spherical aberration during focusing with achieving efficient zooming and focusing with limited space. If the ratio exceeds the upper limit value in Conditional Expression (3), the lens unit LN1 has to move a long distance during zooming and focusing, which increases the total length of the zoom lens, it is not preferable.

If the ratio falls below the lower limit value in Conditional Expression (3), the negative refractive power of the lens unit LN1 is too strong (or too large in absolute value), which increases the variation in spherical aberration during focusing, it is not preferable. It is preferable to set the numerical values in Conditional Expression (3) as follows:

$$0.03 < -\Delta M_{LN1}/Tdw < 0.09. \quad (3a)$$

Conditional Expression (4) is defined to perform zooming effectively and offer high optical performance. If the ratio exceeds the upper limit value in Conditional Expression (4), the lens unit LN2 has to move a long distance during zooming, which increases the height h of axial rays incident on the focusing lens unit LN1 and thus increases aberration variation during focusing, it is not preferable. If the ratio falls below the lower limit value in Conditional Expression (4), it is difficult to perform magnification-varying effectively. Preferably, the numerical values in Conditional Expression (4) are set as follows:

$$0.07 < -\Delta M_{LN2}/Tdw < 0.20. \quad (4a)$$

Conditional Expression (5) is defined to reduce the size of the zoom lens with ensuring a predetermined zoom ratio. If the ratio exceeds the upper limit value in Conditional Expression (5), the negative refractive power of the lens unit LN2 is too strong, which makes the combined power of the lens unit LP2 and the lens unit LN2 negatively strong. Then, the focusing sensitivity of the focusing lens unit LN1 decreases, which makes the size of the zoom lens large.

If the ratio falls below the lower limit value in Conditional Expression (5), the negative refractive power of the lens unit LN2 is too weak, which diminishes the magnification-varying effect, it is not preferable. It is more preferable to set the numerical values in Conditional Expression (5) as follows:

$$0.50 < -f_{LP2}/f_{LN2} < 1.20. \quad (5a)$$

Conditional Expressions (6) to (9) are defined to appropriately set the refractive powers of the lens unit LP1, the lens unit LN1, the lens unit LP2, and the lens unit LN2, respectively. If the ratio exceeds the upper limit value in Conditional Expression (6), the positive refractive power of the lens unit LP1 is too weak, which diminishes the assisting effect of the magnification-varying to be achieved by the change in the interval to the lens unit LN1, it is not preferable. If the ratio falls below the lower limit value in Conditional Expression (6), the positive refractive power of the lens unit LP1 is too strong, which increases variation in spherical aberration during zooming, it is not preferable.

If the ratio exceeds the upper limit of Conditional Expression (7), the lens unit LN1 has to move a long distance during focusing, which increases the total length of the zoom lens, it is not preferable. If the ratio falls below the lower limit value in Conditional Expression (7), variation in spherical aberration increases during focusing, it is not preferable.

If the ratio exceeds the upper limit value of Conditional Expression (8), the positive refractive power of the lens unit LP2 is too weak, which decreases the focusing sensitivity of the lens unit LN1, it is not preferable. If the ratio falls below the lower limit value in Conditional Expression (8), the positive refractive power of the lens unit LP2 is too strong, which increases variation in field curvature when the lens unit LN2 moves, it is not preferable.

If the ratio exceeds the upper limit value in Conditional Expression (9), the negative refractive power of the lens unit LN2 is too weak, which diminishes the magnification-varying effect, it is not preferable. If the ratio falls below the lower limit value in Conditional Expression (9), the negative refractive power of the lens unit LN2 is too strong, which increases variation in field curvature during zooming, it is not preferable.

It is more preferable to set the numerical values in Conditional Expressions (6), (7), (8), and (9) as follows:

$$0.15 < f_{LP1}/ft < 0.30, \quad (6a)$$

$$0.20 < -f_{LN1}/ft < 0.40, \quad (7a)$$

$$0.40 < f_{LP2}/ft < 0.80, \text{ and} \quad (8a)$$

$$0.50 < -f_{LN2}/ft < 1.20. \quad (9a)$$

Next, preferred lens configurations of the zoom lens of each Example are described. Preferably, the lens unit LP2 does not move during zooming. To increase the number of magnification-varying lens units by making use of a short back focus is effective in reducing the total length of the zoom lens, but when the holding structure is complicated, the main body becomes large.

Thus, during zooming, the lens unit LN2 moves toward the lens unit LP2 with the lens unit LP2 not moving, so that simple structure is easily obtained. The second lens unit L2 may serve as an image stabilization lens unit (IS) that, during image blur correction, moves in a direction including a component perpendicular to the optical axis. Image blur can thus be effectively corrected.

Next, an embodiment of a digital still camera (an image pickup apparatus) using the zoom lens of each Example as its image pickup optical system is described using FIG. 11.

In FIG. 11, the digital still camera includes an image pickup optical system 11 formed by the zoom lens of each Example in the camera body 10. The digital still camera also includes a solid-state image pickup element (photo-electric conversion element) 12 such as a CCD or CMOS sensor that is incorporated in the camera body 10 and receives light of a subject image formed by the image pickup optical system 11.

Thus, by applying the zoom lens of each Example to an image pickup apparatus such as a digital still camera, a zoom lens and an image pickup apparatus having a high zoom ratio, a short total length of the zoom lens, and a small total size, and offers good optical performance even during image blur correction can be obtained.

Numerical data 1 to 5 corresponding to Examples 1 to 5 are presented as follows. In each Numerical data, i indicates the order of a surface from the object side. The curvature radius of the i-th lens surface from the object side is represented by ri. The lens thickness and air interval between the i-th lens surface and the (i+1)-th lens surface from the object side is represented by di. The refractive index and the Abbe number of the material of a lens between the i-th lens surface and the (i+1)-th lens surface from the object side are represented by ndi and vdi, respectively. A back focus is represented by BF. With an X axis being the optical-axis direction, an H axis being perpendicular to the optical axis, a light travelling direction being positive, "R" being a paraxial curvature radius, and "K", "A2", "A4", "A6", "A8", "A10" and "A12" each being an aspherical coefficient, an aspherical shape is expressed as follows.

$$X = \frac{(1/R)}{1 + \sqrt{1 - (1+K)(H/R)^2}} + A2 \cdot H^2 + A4 \cdot H^4 + A6 \cdot H^6 + A8 \cdot H^8 + A10 \cdot H^{10} + A12 \cdot H^{12}$$

In each aspherical coefficient, "e-x" indicates "$10^{-x}$". Further, in addition to specifications such as focal lengths and F-numbers, the half angle of each zoom lens is presented. The field height is the maximum field height that determines a half angle of view, and the total length of the zoom lens is the distance from the first lens surface to the image plane. The back focal length BF indicates the length from the last lens surface to the image plane. Further, the zoom lens unit data provide the focal lengths of the lens units.

Moreover, when an optical surface is denoted by "(variable)" under distance "d", it means that the distance varies during zooming, and specific surface intervals for respective focal lengths are described in a separate table. Table 1 at the end shows calculation results for the conditional expressions based on the lens data of Numerical data 1 to 5 described below.

[Numerical Data 1]

[Unit mm]

Surface data

| Surface number | r | d | nd | vd | Effective diameter |
|---|---|---|---|---|---|
| 1 | 109.721 | 5.99 | 1.48749 | 70.2 | 74.50 |
| 2 | 305.911 | 0.15 | | | 73.73 |
| 3 | 98.280 | 2.90 | 1.83400 | 37.2 | 71.23 |
| 4 | 62.911 | 12.32 | 1.43875 | 94.7 | 67.69 |
| 5 | −4433.385 | (variable) | | | 66.74 |
| 6 | −219.409 | 1.50 | 1.77250 | 49.6 | 33.62 |
| 7 | 54.959 | 4.54 | | | 32.12 |
| 8 | −64.270 | 1.50 | 1.60311 | 60.6 | 32.15 |
| 9 | 59.426 | 4.76 | 1.90366 | 31.3 | 34.19 |
| 10 | −211.760 | (variable) | | | 34.47 |
| 11 (stop) | ∞ | 1.00 | | | (variable) |
| 12 | 59.130 | 5.45 | 1.76385 | 48.5 | 35.83 |
| 13 | −154.924 | (variable) | | | 35.62 |
| 14 | −44.185 | 1.50 | 1.85478 | 24.8 | 30.86 |
| 15 | 79.640 | 2.12 | | | 31.70 |
| 16 | 78.702 | 4.03 | 1.89286 | 20.4 | 33.34 |
| 17 | −243.555 | (variable) | | | 33.57 |
| 18 | ∞ | 2.41 | | | 33.94 |
| 19 | −308.726 | 4.69 | 1.76385 | 48.5 | 34.36 |
| 20 | −45.842 | 0.15 | | | 35.00 |
| 21 | 84.759 | 8.06 | 1.59522 | 67.7 | 35.24 |
| 22 | −36.286 | 1.70 | 1.90366 | 31.3 | 35.04 |
| 23 | −329.315 | 0.15 | | | 35.51 |
| 24 | 46.838 | 4.34 | 1.59522 | 67.7 | 35.76 |
| 25 | 173.025 | (variable) | | | 35.30 |
| 26 | −503.722 | 1.60 | 1.83481 | 42.7 | 32.29 |
| 27 | 43.640 | (variable) | | | 31.54 |
| 28 | 227.711 | 1.80 | 1.53172 | 48.8 | 34.88 |
| 29 | 64.457 | 5.19 | 1.68893 | 31.1 | 35.44 |

-continued

[Unit mm]

| | | | | | |
|---|---|---|---|---|---|
| 30 | −170.565 | (variable) | | | 35.61 |
| 31 | −62.118 | 1.80 | 1.59522 | 67.7 | 37.29 |
| 32 | −162.417 | | | | 38.33 |

Various data
Zoom ratio 2.71

| | Wide angle | Intermediate | Telephoto |
|---|---|---|---|
| Focal length | 72.00 | 135.00 | 195.00 |
| F-number | 2.87 | 2.91 | 2.96 |
| Half angle of view (deg.) | 16.72 | 9.10 | 6.33 |
| Image height | 21.64 | 21.64 | 21.64 |
| Total length of the zoom lens | 172.73 | 227.71 | 242.23 |
| BF | 14.42 | 26.52 | 40.61 |
| d5 | 1.64 | 61.99 | 83.07 |
| d10 | 14.35 | 9.69 | 1.81 |
| d13 | 5.55 | 10.13 | 13.97 |
| d17 | 9.35 | 4.06 | 1.55 |
| d25 | 9.43 | 5.29 | 2.54 |
| d27 | 8.36 | 12.50 | 15.25 |
| d30 | 29.97 | 17.87 | 3.78 |
| ea11 | 29.26 | 32.32 | 34.77 |
| Entrance pupil position | 39.45 | 173.98 | 244.75 |
| Exit pupil position | −68.12 | −65.80 | −63.60 |
| Front principal point position | 48.64 | 111.58 | 74.88 |
| Rear principal point position | −57.58 | −108.48 | −154.39 |

Zoom lens unit data

| Unit | Start surface | Focal length | Lens structure length | Front principal point position | Rear principal point position |
|---|---|---|---|---|---|
| 1 | 1 | 190.72 | 21.36 | −1.04 | −15.29 |
| 2 | 6 | −58.13 | 12.30 | −0.47 | −9.55 |
| 3 | 11 | 56.65 | 6.45 | 1.86 | −2.26 |
| 4 | 14 | −71.95 | 7.65 | −3.11 | −8.50 |
| 5 | 18 | 40.67 | 21.51 | 6.25 | −7.84 |
| 6 | 26 | −48.04 | 1.60 | 0.80 | −0.07 |
| 7 | 28 | 114.47 | 6.99 | 2.29 | −1.99 |
| 8 | 31 | −170.13 | 1.80 | −0.70 | −1.84 |

Single lens data

| Lens | Start surface | Focal length |
|---|---|---|
| 1 | 1 | 347.47 |
| 2 | 3 | −217.72 |
| 3 | 4 | 141.50 |
| 4 | 6 | −56.76 |
| 5 | 8 | −50.96 |
| 6 | 9 | 51.78 |
| 7 | 12 | 56.65 |
| 8 | 14 | −33.06 |
| 9 | 16 | 67.01 |
| 10 | 19 | 69.94 |
| 11 | 21 | 43.78 |
| 12 | 22 | −45.25 |
| 13 | 24 | 106.53 |
| 14 | 26 | −48.04 |
| 15 | 28 | −169.74 |
| 16 | 29 | 68.52 |
| 17 | 31 | −170.13 |

[Numerical Data 2]

[Unit mm]

Surface data

| Surface number | r | d | nd | vd | Effective diameter |
|---|---|---|---|---|---|
| 1 | 153.849 | 4.00 | 1.48749 | 70.2 | 73.35 |
| 2 | 314.421 | 0.15 | | | 72.84 |
| 3 | 84.753 | 2.90 | 1.83400 | 37.2 | 70.87 |
| 4 | 58.506 | 0.15 | | | 67.46 |
| 5 | 57.594 | 13.26 | 1.43387 | 95.1 | 67.48 |
| 6 | −1071.255 | (variable) | | | 66.80 |
| 7 | −259.027 | 1.50 | 1.77250 | 49.6 | 33.57 |
| 8 | 56.303 | 4.51 | | | 32.66 |
| 9 | −61.789 | 1.50 | 1.60311 | 60.6 | 32.64 |
| 10 | 63.442 | 4.70 | 1.90366 | 31.3 | 34.75 |
| 11 | −191.582 | (variable) | | | 35.03 |
| 12 (stop) | ∞ | 1.00 | | | (variable) |
| 13 | 63.598 | 5.44 | 1.76385 | 48.5 | 36.27 |
| 14 | −129.460 | (variable) | | | 36.06 |
| 15 | −44.024 | 1.50 | 1.85478 | 24.8 | 30.82 |
| 16 | 85.264 | 1.96 | | | 31.64 |
| 17 | 78.426 | 4.38 | 1.89286 | 20.4 | 33.11 |
| 18 | −265.057 | (variable) | | | 33.39 |
| 19 | ∞ | 3.09 | | | 33.91 |
| 20 | −292.268 | 4.92 | 1.76385 | 48.5 | 34.40 |
| 21 | −46.700 | 0.15 | | | 35.06 |
| 22 | 91.180 | 8.48 | 1.59522 | 67.7 | 34.90 |
| 23 | −35.947 | 1.70 | 1.90366 | 31.3 | 34.51 |
| 24 | −319.043 | 0.15 | | | 34.75 |
| 25 | 47.623 | 4.61 | 1.59522 | 67.7 | 34.69 |
| 26 | 208.981 | (variable) | | | 34.09 |
| 27 | −733.933 | 1.60 | 1.83481 | 42.7 | 32.35 |
| 28 | 43.245 | (variable) | | | 31.49 |
| 29 | 243.136 | 1.80 | 1.53172 | 48.8 | 34.91 |
| 30 | 55.158 | 5.54 | 1.68893 | 31.1 | 35.58 |
| 31 | −190.843 | (variable) | | | 35.72 |
| 32 | −64.795 | 1.80 | 1.59522 | 67.7 | 37.00 |
| 33 | −216.528 | | | | 38.03 |

Various data
Zoom ratio 2.71

| | Wide angle | Intermediate | Telephoto |
|---|---|---|---|
| Focal length | 72.00 | 135.00 | 194.99 |
| F-number | 2.92 | 2.92 | 2.92 |
| Half angle of view (deg.) | 16.73 | 9.10 | 6.33 |
| Image height | 21.64 | 21.64 | 21.64 |
| Total length of the zoom lens | 172.73 | 227.50 | 242.86 |
| BF | 14.38 | 26.45 | 39.44 |
| d6 | 1.52 | 62.16 | 83.89 |
| d11 | 14.49 | 9.21 | 1.75 |
| d14 | 5.48 | 9.90 | 13.65 |
| d18 | 9.91 | 4.91 | 2.27 |
| d26 | 9.71 | 5.47 | 2.33 |
| d28 | 8.55 | 12.79 | 15.92 |
| d31 | 27.92 | 15.84 | 2.84 |
| ea12 | 28.75 | 32.36 | 35.54 |
| Entrance pupil position | 38.39 | 168.62 | 240.35 |
| Exit pupil position | −66.33 | −64.60 | −63.34 |
| Front principal point position | 46.17 | 103.46 | 65.42 |
| Rear principal point position | −57.62 | −108.55 | −155.54 |

Zoom lens unit data

| Unit | Start surface | Focal length | Lens structure length | Front principal point position | Rear principal point position |
|---|---|---|---|---|---|
| 1 | 1 | 191.47 | 20.45 | 0.21 | −13.63 |
| 2 | 7 | −60.35 | 12.21 | −0.49 | −9.53 |
| 3 | 12 | 56.52 | 6.44 | 2.03 | −2.09 |
| 4 | 15 | −73.41 | 7.84 | −2.98 | −8.37 |
| 5 | 19 | 41.71 | 23.09 | 7.30 | −8.05 |
| 6 | 27 | −48.87 | 1.60 | 0.82 | −0.05 |
| 7 | 29 | 116.67 | 7.34 | 2.26 | −2.22 |
| 8 | 32 | −156.04 | 1.80 | −0.48 | −1.62 |

Single lens data

| Lens | Start surface | Focal length |
|---|---|---|
| 1 | 1 | 612.97 |
| 2 | 3 | −238.50 |

[Unit mm]

| | | |
|---|---|---|
| 3 | 5 | 126.42 |
| 4 | 7 | −59.75 |
| 5 | 9 | −51.67 |
| 6 | 10 | 53.21 |
| 7 | 13 | 56.52 |
| 8 | 15 | −33.79 |
| 9 | 17 | 68.19 |
| 10 | 20 | 72.14 |
| 11 | 22 | 44.42 |
| 12 | 23 | −44.96 |
| 13 | 25 | 102.53 |
| 14 | 27 | −48.87 |
| 15 | 29 | −134.62 |
| 16 | 30 | 62.69 |
| 17 | 32 | −156.04 |

[Numerical Data 3]

[Unit mm]

Surface data

| Surface number | r | d | nd | vd | Effective diameter |
|---|---|---|---|---|---|
| 1 | 77.876 | 2.90 | 1.83400 | 37.2 | 67.67 |
| 2 | 58.365 | 0.15 | | | 65.03 |
| 3 | 57.714 | 12.31 | 1.43387 | 95.1 | 65.14 |
| 4 | 3265.962 | (variable) | | | 64.67 |
| 5 | 62.166 | 5.29 | 1.49700 | 81.5 | 47.10 |
| 6 | 283.921 | (variable) | | | 46.39 |
| 7 | −2565.283 | 1.50 | 1.77250 | 49.6 | 32.43 |
| 8 | 43.446 | 5.17 | | | 31.00 |
| 9 | −54.195 | 1.50 | 1.60311 | 60.6 | 31.00 |
| 10 | 51.726 | 4.59 | 1.90366 | 31.3 | 32.44 |
| 11 | −289.087 | (variable) | | | 32.57 |
| 12 (stop) | ∞ | 1.00 | | | (variable) |
| 13 | 136.885 | 4.46 | 1.76385 | 48.5 | 32.81 |
| 14 | −72.151 | (variable) | | | 32.70 |
| 15 | −36.684 | 1.50 | 1.85478 | 24.8 | 29.00 |
| 16 | 147.718 | 0.15 | | | 30.03 |
| 17 | 84.403 | 3.64 | 1.89286 | 20.4 | 30.58 |
| 18 | −184.640 | (variable) | | | 30.84 |
| 19 | ∞ | 4.00 | | | 31.44 |
| 20 | −189.924 | 4.10 | 1.76385 | 48.5 | 32.48 |
| 21 | −44.163 | 0.15 | | | 33.00 |
| 22 | 90.178 | 7.36 | 1.59522 | 67.7 | 33.23 |
| 23 | −34.578 | 1.70 | 1.90366 | 31.3 | 33.08 |
| 24 | −209.530 | 0.15 | | | 33.61 |
| 25 | 68.698 | 3.53 | 1.59522 | 67.7 | 33.75 |
| 26 | 834.826 | (variable) | | | 33.56 |
| 27 | 807.473 | 1.60 | 1.83481 | 42.7 | 30.98 |
| 28 | 43.535 | (variable) | | | 30.31 |
| 29 | −662.294 | 1.80 | 1.53172 | 48.8 | 34.21 |
| 30 | 44.273 | 6.75 | 1.68893 | 31.1 | 35.21 |
| 31 | −120.619 | (variable) | | | 35.35 |
| 32 | −57.107 | 1.80 | 1.59522 | 67.7 | 36.09 |
| 33 | −232.185 | | | | 37.31 |

Various data
Zoom ratio 2.71

| | Wide angle | Intermediate | Telephoto |
|---|---|---|---|
| Focal length | 72.00 | 135.00 | 194.98 |
| F-number | 2.90 | 2.90 | 2.90 |
| Half angle of view (deg.) | 16.72 | 9.11 | 6.33 |
| Image height | 21.64 | 21.64 | 21.64 |
| Total length of the zoom lens | 172.73 | 218.46 | 231.71 |
| BF | 14.37 | 24.57 | 33.27 |
| d4 | 1.00 | 46.74 | 60.00 |
| d6 | 1.54 | 14.80 | 24.44 |
| d11 | 22.49 | 11.83 | 2.05 |
| d14 | 4.63 | 7.36 | 8.54 |
| d18 | 8.72 | 3.39 | 2.34 |
| d26 | 13.84 | 8.23 | 1.50 |
| d28 | 7.44 | 13.05 | 19.78 |
| d31 | 21.60 | 11.40 | 2.69 |
| ea12 | 28.14 | 31.02 | 32.70 |
| Entrance pupil position | 50.38 | 169.98 | 234.87 |
| Exit pupil position | −57.02 | −55.16 | −57.46 |
| Front principal point position | 49.77 | 76.40 | 10.85 |
| Rear principal point position | −57.63 | −110.42 | −161.71 |

Zoom lens unit data

| Unit | Start surface | Focal length | Lens structure length | Front principal point position | Rear principal point position |
|---|---|---|---|---|---|
| 1 | 1 | 254.46 | 15.36 | −2.78 | −13.04 |
| 2 | 5 | 158.89 | 5.29 | −0.98 | −4.48 |
| 3 | 7 | −49.87 | 12.76 | 0.57 | −8.94 |
| 4 | 12 | 62.43 | 5.46 | 2.67 | −0.88 |
| 5 | 15 | −75.45 | 5.29 | −1.46 | −4.42 |
| 6 | 19 | 43.42 | 20.99 | 7.91 | −6.54 |
| 7 | 27 | −55.17 | 1.60 | 0.92 | 0.05 |
| 8 | 29 | 118.97 | 8.55 | 4.00 | −1.20 |
| 9 | 32 | −127.73 | 1.80 | −0.37 | −1.50 |

Single lens data

| Lens | Start surface | Focal length |
|---|---|---|
| 1 | 1 | −299.57 |
| 2 | 3 | 135.26 |
| 3 | 5 | 158.89 |
| 4 | 7 | −55.29 |
| 5 | 9 | −43.65 |
| 6 | 10 | 48.87 |
| 7 | 13 | 62.43 |
| 8 | 15 | −34.25 |
| 9 | 17 | 65.29 |
| 10 | 20 | 74.43 |
| 11 | 22 | 42.94 |
| 12 | 23 | −46.04 |
| 13 | 25 | 125.55 |
| 14 | 27 | −55.17 |
| 15 | 29 | −77.98 |
| 16 | 30 | 47.81 |
| 17 | 32 | −127.73 |

[Numerical Data 4]

[Unit mm]

Surface data

| Surface number | r | d | nd | vd | Effective diameter |
|---|---|---|---|---|---|
| 1 | 103.840 | 2.90 | 1.83400 | 37.2 | 67.21 |
| 2 | 63.802 | 0.15 | | | 65.30 |
| 3 | 63.293 | 10.63 | 1.43387 | 95.1 | 65.42 |
| 4 | 606.140 | 0.88 | | | 65.24 |
| 5 | 73.595 | 9.31 | 1.49700 | 81.5 | 64.77 |
| 6 | −49037.103 | (variable) | | | 64.12 |
| 7 | −247.482 | 1.50 | 1.77250 | 49.6 | 41.10 |
| 8 | 55.241 | 4.47 | | | 38.28 |
| 9 | −114.175 | 1.50 | 1.60311 | 60.6 | 38.45 |
| 10 | 49.033 | 5.11 | 1.90366 | 31.3 | 38.06 |
| 11 | 6489.383 | (variable) | | | 37.83 |
| 12 (stop) | ∞ | 1.00 | | | (variable) |
| 13 | 87.182 | 5.24 | 1.76385 | 48.5 | 37.48 |
| 14 | −123.368 | (variable) | | | 37.20 |
| 15 | −47.669 | 1.50 | 1.85478 | 24.8 | 31.90 |
| 16 | 97.690 | 0.15 | | | 32.69 |
| 17 | 76.387 | 4.14 | 1.89286 | 20.4 | 33.04 |
| 18 | −260.494 | (variable) | | | 33.20 |
| 19 | ∞ | 2.00 | | | 34.98 |

-continued

[Unit mm]

| | | | | | |
|---|---|---|---|---|---|
| 20 | −304.646 | 4.51 | 1.76385 | 48.5 | 35.48 |
| 21 | −51.689 | 0.15 | | | 35.92 |
| 22 | 97.124 | 7.72 | 1.59522 | 67.7 | 35.69 |
| 23 | −38.689 | 1.70 | 1.90366 | 31.3 | 35.40 |
| 24 | −396.262 | 0.15 | | | 35.59 |
| 25 | 69.798 | 3.97 | 1.59522 | 67.7 | 35.65 |
| 26 | 1092.733 | (variable) | | | 35.37 |
| 27 | −1244.993 | 1.60 | 1.83481 | 42.7 | 31.66 |
| 28 | 45.593 | (variable) | | | 31.10 |
| 29 | −3443.388 | 1.80 | 1.53172 | 48.8 | 34.15 |
| 30 | 42.345 | 6.74 | 1.68893 | 31.1 | 35.13 |
| 31 | −138.940 | (variable) | | | 35.25 |
| 32 | −51.591 | 1.80 | 1.59522 | 67.7 | 36.56 |
| 33 | −141.947 | | | | 37.81 |

Various data
Zoom ratio 2.71

| | Wide angle | Intermediate | Telephoto |
|---|---|---|---|
| Focal length | 72.00 | 135.09 | 194.98 |
| F-number | 2.89 | 3.15 | 3.35 |
| Half angle of view (deg.) | 16.72 | 9.10 | 6.33 |
| Image height | 21.64 | 21.64 | 21.64 |
| Total length of the zoom lens | 207.73 | 207.72 | 207.71 |
| BF | 14.37 | 24.43 | 34.43 |
| d6 | 1.85 | 33.70 | 50.04 |
| d11 | 45.07 | 18.54 | 2.53 |
| d14 | 6.41 | 9.13 | 11.72 |
| d18 | 14.05 | 6.01 | 3.09 |
| d26 | 13.64 | 8.94 | 1.71 |
| d28 | 8.49 | 13.20 | 20.43 |
| d31 | 23.24 | 13.18 | 3.17 |
| ea12 | 32.05 | 35.90 | 37.31 |
| Entrance pupil position | 65.81 | 128.50 | 158.14 |
| Exit pupil position | −62.02 | −57.96 | −59.85 |
| Front principal point position | 69.95 | 42.07 | −50.13 |
| Rear principal point position | −57.63 | −110.67 | −160.55 |

Zoom lens unit data

| Unit | Start surface | Focal length | Lens structure length | Front principal point position | Rear principal point position |
|---|---|---|---|---|---|
| 1 | 1 | 128.52 | 23.87 | 6.81 | −9.70 |
| 2 | 7 | −61.51 | 12.58 | 0.16 | −8.85 |
| 3 | 12 | 67.60 | 6.24 | 2.24 | −1.76 |
| 4 | 15 | −88.49 | 5.79 | −1.32 | −4.53 |
| 5 | 19 | 48.72 | 20.20 | 5.90 | −7.28 |
| 6 | 27 | −52.66 | 1.60 | 0.84 | −0.03 |
| 7 | 29 | 118.37 | 8.54 | 3.54 | −1.66 |
| 8 | 32 | −137.19 | 1.80 | −0.65 | −1.79 |

Single lens data

| Lens | Start surface | Focal length |
|---|---|---|
| 1 | 1 | −205.16 |
| 2 | 3 | 161.93 |
| 3 | 5 | 147.87 |
| 4 | 7 | −58.33 |
| 5 | 9 | −56.68 |
| 6 | 10 | 54.65 |
| 7 | 13 | 67.60 |
| 8 | 15 | −37.30 |
| 9 | 17 | 66.54 |
| 10 | 20 | 80.87 |
| 11 | 22 | 47.49 |
| 12 | 23 | −47.55 |
| 13 | 25 | 125.08 |
| 14 | 27 | −52.66 |
| 15 | 29 | −78.66 |
| 16 | 30 | 47.83 |
| 17 | 32 | −137.19 |

[Numerical Data 5]

[Unit mm]

Surface data

| Surface number | r | d | nd | vd | Effective diameter |
|---|---|---|---|---|---|
| 1 | 66.660 | 4.35 | 1.83400 | 37.2 | 52.42 |
| 2 | 144.021 | 6.39 | | | 51.80 |
| 3 | 107.986 | 2.90 | 1.83400 | 37.2 | 48.29 |
| 4 | 42.714 | 8.58 | 1.43875 | 94.7 | 45.26 |
| 5 | 1237.998 | (variable) | | | 44.69 |
| 6 | 850.817 | 1.50 | 1.77250 | 49.6 | 24.10 |
| 7 | 54.192 | 3.29 | | | 23.54 |
| 8 | −39.322 | 1.50 | 1.77250 | 49.6 | 23.55 |
| 9 | 41.848 | 5.00 | 1.83400 | 37.2 | 25.13 |
| 10 | −56.406 | (variable) | | | 25.61 |
| 11 (stop) | ∞ | 2.06 | | | 26.65 |
| 12 | −85.566 | 2.37 | 1.76385 | 48.5 | 27.01 |
| 13 | −46.397 | 0.15 | | | 27.38 |
| 14 | 108.911 | 4.83 | 1.59522 | 67.7 | 27.41 |
| 15 | −36.361 | 1.70 | 1.90366 | 31.3 | 27.41 |
| 16 | −107.055 | 0.15 | | | 27.87 |
| 17 | 32.791 | 3.07 | 1.49700 | 81.5 | 27.97 |
| 18 | 65.998 | (variable) | | | 27.57 |
| 19 | −257.233 | 1.60 | 1.51633 | 64.1 | 24.27 |
| 20 | 36.519 | (variable) | | | 23.99 |
| 21 | 599.321 | 6.29 | 1.51823 | 58.9 | 36.14 |
| 22 | −45.923 | (variable) | | | 36.70 |
| 23 | −49.127 | 1.80 | 1.49700 | 81.5 | 36.82 |
| 24 | −196.380 | | | | 38.28 |

Various data
Zoom ratio 1.95

| | Wide angle | Intermediate | Telephoto |
|---|---|---|---|
| Focal length | 100.00 | 150.00 | 195.00 |
| F-number | 3.93 | 4.02 | 3.96 |
| Half angle of view (deg.) | 12.21 | 8.21 | 6.33 |
| Image height | 21.64 | 21.64 | 21.64 |
| Total length of the zoom lens | 167.73 | 207.60 | 231.68 |
| BF | 14.37 | 26.69 | 33.55 |
| d5 | 0.92 | 44.15 | 71.55 |
| d10 | 11.17 | 4.68 | 1.03 |
| d18 | 14.07 | 9.49 | 2.95 |
| d20 | 16.23 | 23.96 | 30.82 |
| d22 | 53.44 | 41.11 | 34.25 |
| Entrance pupil position | 41.04 | 127.12 | 223.98 |
| Exit pupil position | −65.70 | −67.87 | −69.56 |
| Front principal point position | 16.15 | 39.18 | 50.17 |
| Rear principal point position | −85.63 | −123.31 | −161.46 |

Zoom lens unit data

| Unit | Start surface | Focal length | Lens structure length | Front principal point position | Rear principal point position |
|---|---|---|---|---|---|
| 1 | 1 | 186.14 | 22.22 | −8.75 | −24.16 |
| 2 | 6 | −66.19 | 11.29 | −2.16 | −10.57 |
| 3 | 11 | 47.70 | 14.33 | 5.20 | −4.42 |
| 4 | 19 | −61.82 | 1.60 | 0.92 | −0.13 |
| 5 | 21 | 82.58 | 6.29 | 3.86 | −0.30 |
| 6 | 23 | −132.36 | 1.80 | −0.40 | −1.61 |

Single lens data

| Lens | Start surface | Focal length |
|---|---|---|
| 1 | 1 | 145.09 |
| 2 | 3 | −86.48 |
| 3 | 4 | 100.61 |
| 4 | 6 | −74.99 |
| 5 | 8 | −26.03 |
| 6 | 9 | 29.49 |
| 7 | 12 | 129.29 |
| 8 | 14 | 46.37 |

-continued

[Unit mm]

| 9 | 15 | −61.64 |
| 10 | 17 | 127.23 |
| 11 | 19 | −61.82 |
| 12 | 21 | 82.58 |
| 13 | 23 | −132.36 |

TABLE 1

| Conditional Expression | Parameter | Numerical data | | | | |
|---|---|---|---|---|---|---|
| | | 1 | 2 | 3 | 4 | 5 |
| | fw | 72 | 72 | 72 | 72 | 100 |
| | ft | 195 | 194.99 | 194.98 | 194.98 | 195 |
| | Tdw | 172.73 | 172.73 | 172.73 | 207.73 | 167.73 |
| | Tdt | 242.23 | 242.86 | 231.71 | 207.73 | 231.68 |
| | ΔLPN2 | −26.19 | −25.08 | −18.91 | −20.07 | −19.17 |
| | $\Delta M_{LN1}$ | −6.89 | −7.37 | −12.34 | −11.93 | −14.59 |
| | $\Delta M_{LN2}$ | −26.19 | −25.08 | −18.9 | −20.07 | −19.17 |
| | $f_{LP1}$ | 40.67 | 41.71 | 43.42 | 48.72 | 47.7 |
| | $f_{LN1}$ | −48.04 | −48.87 | −55.17 | −52.66 | −61.82 |
| | $f_{LP2}$ | 114.47 | 116.67 | 118.97 | 118.37 | 82.58 |
| | $f_{LN2}$ | −170.13 | −156.04 | −127.73 | −137.19 | −132.36 |
| (1) | ft/Tdt | 0.805 | 0.803 | 0.841 | 0.939 | 0.842 |
| (2) | −ΔLPN2/Tdw | 0.152 | 0.145 | 0.109 | 0.097 | 0.114 |
| (3) | $-\Delta M_{LN1}$/Tdw | 0.040 | 0.043 | 0.071 | 0.057 | 0.087 |
| (4) | $-\Delta M_{LN2}$/Tdw | 0.152 | 0.145 | 0.109 | 0.097 | 0.114 |
| (5) | $-f_{LP2}/f_{LN2}$ | 0.673 | 0.748 | 0.931 | 0.863 | 0.624 |
| (6) | $f_{LP1}$/ft | 0.209 | 0.214 | 0.223 | 0.250 | 0.245 |
| (7) | $-f_{LN1}$/ft | 0.246 | 0.251 | 0.283 | 0.270 | 0.317 |
| (8) | $f_{LP2}$/ft | 0.587 | 0.598 | 0.610 | 0.607 | 0.423 |
| (9) | $-f_{LN2}$/ft | 0.872 | 0.800 | 0.655 | 0.704 | 0.679 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-126010, filed Jun. 28, 2017, which is hereby incorporated by reference herein in its entirety.

What is claimed is:

1. A zoom lens comprising a lens unit LP having a positive refractive power and disposed closest to an object side, a lens unit LNF having a negative refractive power and disposed at an image side of the lens unit LP, and an aperture stop disposed at the image side of the lens unit LNF, the zoom lens further comprising at the image side of the aperture stop, successively in order from the object side to the image side, a lens unit LP1 having a positive refractive power, a lens unit LN1 having a negative refractive power, a lens unit LP2 having a positive refractive power, and a lens unit LN2 having a negative refractive power, intervals between adjacent ones of the lens units being changed during zooming, wherein the lens unit LN1 moves during focusing, and wherein the following conditional expressions are satisfied:

$$0.40 < ft/Tdt < 1.20, \text{ and}$$

$$0.05 < -\Delta LPN2/Tdw < 0.30,$$

where ft represents a focal length of the zoom lens at a telephoto end, Tdt represents a total length of the zoom lens at the telephoto end, Tdw represents a total length of the zoom lens at a wide angle end, and ΔLPN2 represents an amount of change from a lens unit interval between the lens unit LP2 and the lens unit LN2 at the wide angle end to the lens unit interval between the lens unit LP2 and the lens unit LN2 at the telephoto end, ΔLPN2 having a positive sign when the lens unit interval is larger at the telephoto end than at the wide angle end and having a negative sign when the lens unit interval is smaller at the telephoto end than at the wide angle end.

2. The zoom lens according to claim 1, wherein the lens unit LP2 does not move during zooming.

3. The zoom lens according to claim 1, wherein the following conditional expression is satisfied:

$$0.02 < -\Delta M_{LN1}/Tdw < 0.10,$$

where $\Delta M_{LN1}$ represents a moving amount of the lens unit LN1 in zooming from the wide angle end to the telephoto end, the moving amount having a positive sign when the lens unit LN1 is located closer to the image side at the telephoto end than at the wide angle end and having a negative sign when the lens unit LN1 is located closer to the object side at the telephoto end than at the wide angle end.

4. The zoom lens according to claim 1, wherein the following conditional expression is satisfied:

$$0.05 < -\Delta M_{LN2}/Tdw < 0.30,$$

where $\Delta M_{LN2}$ represents a moving amount of the lens unit LN2 in zooming from the wide angle end to the telephoto end, the moving amount having a positive sign when the lens unit LN2 is located closer to the image side at the telephoto end than at the wide angle end and having a negative sign when the lens unit LN2 is located closer to the object side at the telephoto end than at the wide angle end.

5. The zoom lens according to claim 1, wherein the following conditional expression is satisfied:

$$0.40 < -f_{LP2}/f_{LN2} < 1.50,$$

where $f_{LP2}$ represents a focal length of the lens unit LP2, and $f_{LN2}$ represents a focal length of the lens unit LN2.

6. The zoom lens according to claim 1, wherein the following conditional expression is satisfied:

$$0.10 < f_{LP1}/ft < 0.40,$$

where $f_{LP1}$ represents a focal length of the lens unit LP1.

7. The zoom lens according to claim 1, wherein the following conditional expression is satisfied:

$$0.10 < -f_{LN1}/ft < 0.50,$$

where $f_{LN1}$ represents a focal length of the lens unit LN1.

8. The zoom lens according to claim 1, wherein the following conditional expression is satisfied:

$$0.30 < f_{LP2}/ft < 1.00,$$

where $f_{LP2}$ represents a focal length of the lens unit LP2.

9. The zoom lens according to claim 1, wherein the following conditional expression is satisfied:

$$0.40 < -f_{LN2}/ft < 1.50,$$

where $f_{LN2}$ represents a focal length of the lens unit LN2.

10. The zoom lens according to claim 1, consisting of, in order from the object side to the image side, a first lens unit having a positive refractive power, a second lens unit having a negative refractive power, an aperture stop, a third lens unit having a positive refractive power, a fourth lens unit having a negative refractive power, a fifth lens unit having a positive refractive power, and a sixth lens unit having a negative refractive power, wherein
  the first lens unit is the lens unit LP,
  the second lens unit is the lens unit LNF,
  the third lens unit is the lens unit LP1,
  the fourth lens unit is the lens unit LN1,
  the fifth lens unit is the lens unit LP2, and
  the sixth lens unit is the lens unit LN2.

11. The zoom lens according to claim 1, consisting of, in order from the object side to the image side, a first lens unit having a positive refractive power, a second lens unit having a negative refractive power, an aperture stop, a third lens unit having a positive refractive power, a fourth lens unit having a negative refractive power, a fifth lens unit having a positive refractive power, a sixth lens unit having a negative refractive power, a seventh lens unit having a positive refractive power, and an eighth lens unit having a negative refractive power, wherein
  the first lens unit is the lens unit LP,
  the second lens unit is the lens unit LNF,
  the fifth lens unit is the lens unit LP1,
  the sixth lens unit is the lens unit LN1,
  the seventh lens unit is the lens unit LP2, and
  the eighth lens unit is the lens unit LN2.

12. The zoom lens according to claim 1, consisting of, in order from the object side to the image side, a first lens unit having a positive refractive power, a second lens unit having a positive refractive power, a third lens unit having a negative refractive power, an aperture stop, a fourth lens unit having a positive refractive power, a fifth lens unit having a negative refractive power, a sixth lens unit having a positive refractive power, a seventh lens unit having a negative refractive power, an eighth lens unit having a positive refractive power, and a ninth lens unit having a negative refractive power, wherein
  the first lens unit is the lens unit LP,
  the third lens unit is the lens unit LNF,
  the sixth lens unit is the lens unit LP1,
  the seventh lens unit is the lens unit LN1,
  the eighth lens unit is the lens unit LP2, and
  the ninth lens unit is the lens unit LN2.

13. An image pickup apparatus comprising:
  a zoom lens; and
  an image pickup element that receives light of an image formed by the zoom lens,
  wherein the zoom lens comprises a lens unit LP having a positive refractive power and disposed closest to an object side, a lens unit LNF having a negative refractive power and disposed at an image side of the lens unit LP, and an aperture stop disposed at the image side of the lens unit LNF, and further comprises, at the image side of the aperture stop, successively in order from the object side to the image side, a lens unit LP1 having a positive refractive power, a lens unit LN1 having a negative refractive power, a lens unit LP2 having a positive refractive power, and a lens unit LN2 having a negative refractive power, intervals between adjacent ones of the lens units being changed during zooming,
  wherein the lens unit LN1 moves during focusing, and
  wherein the following conditional expressions are satisfied:

$$0.40 < ft/Tdt < 1.20, \text{ and}$$

$$0.05 < -\Delta LPN2/Tdw < 0.30,$$

where ft represents a focal length of the zoom lens at a telephoto end, Tdt represents a total length of the zoom lens at the telephoto end, Tdw represents a total length of the zoom lens at a wide angle end, and ΔLPN2 represents an amount of change from a lens unit interval between the lens unit LP2 and the lens unit LN2 at the wide angle end to the lens unit interval between the lens unit LP2 and the lens unit LN2 at the telephoto end, ΔLPN2 having a positive sign when the lens unit interval is larger at the telephoto end than at the wide angle end and having a negative sign when the lens unit interval is smaller at the telephoto end than at the wide angle end.

* * * * *